US006785661B1

(12) United States Patent
Mandler et al.

(10) Patent No.: US 6,785,661 B1
(45) Date of Patent: *Aug. 31, 2004

(54) SYSTEM AND METHOD A RISK BASED PURCHASE OF GOODS

(75) Inventors: Maria M. Mandler, Wilmette, IL (US); Ann P. McLaughlin, River Forest, IL (US); Robert R. Battenfelder, Darien, CT (US); James E. Rouen, New York, NY (US); Levi Y. Orbach, Forest Hills, NY (US); Carol Benson, Oakland, CA (US); Marjorie Engber, New York, NY (US); James E. Nevens, Colleyville, TX (US); William Joseph Krajewski, Thornton, PA (US); Carol A. Baldwin Moody, Brooklyn, NY (US); John P. Figliozzi, St. Charles, IL (US); Keith W. Luke, New Canaan, CT (US); Cornelia Blemings, Atco, NJ (US); Kathleen M. Dixon, Chicago, IL (US)

(73) Assignee: Citibank, N.A., New York, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 09/042,774

(22) Filed: Mar. 17, 1998

(Under 37 CFR 1.47)

Related U.S. Application Data

(63) Continuation of application No. 08/368,290, filed on Jan. 4, 1995, now Pat. No. 5,732,400.

(51) Int. Cl.⁷ .............................................. G06F 17/00
(52) U.S. Cl. ........................................ 705/39; 705/26
(58) Field of Search ..................... 705/53, 77, 26, 705/30, 40, 14, 38, 39, 35

(56) References Cited

U.S. PATENT DOCUMENTS 4,734,564 A * 3/1988 Boston et al. ............... 235/380

4,799,156 A * 1/1989 Shavit et al. ................. 705/26

(List continued on next page.)

FOREIGN PATENT DOCUMENTS

| JP | 2001216432 A | * | 8/2001 | |
| WO | WO9608783 | * | 3/1996 | ........... G06F/17/60 |

(List continued on next page.)

OTHER PUBLICATIONS

Phyllis K. Sokol, "From EDI to Electronic Commerce: A Business Initiative", McGraw–Hill Publisher, 1994.*

Mooney, Sean, "Risk Classification Helps Cut Your Losses", National Underwriter, p. 65, Sep. 1997.*

(List continued on next page.)

Primary Examiner—James P. Trammell
Assistant Examiner—Pierre E Elisca
(74) Attorney, Agent, or Firm—Kramer Levin Naftalis & Frankel LLP

(57) ABSTRACT

A system and method provides for enabling on-line transactional services among sellers and buyers having no previous relationship with each other. The system includes a financial clearinghouse for receiving a request for goods or services from a buyer and making a real-time determination of a risk classification of the buyer utilizing an on-line repository of credit information. The financial clearinghouse determines a risk-based discount fee as a function of the buyer's risk classification in order to establish a payment amount to the seller from the clearinghouse. If the transaction is authorized by the financial clearinghouse, the financial clearinghouse transmits the payment amount to the seller and transmits an invoice to the buyer for the purchase price of the transaction. The system can also include a broker coupled to the financial clearinghouse for providing an on-line order acceptance and processing capability between the buyers and sellers.

26 Claims, 15 Drawing Sheets

U.S. PATENT DOCUMENTS

| | | | | |
|---|---|---|---|---|
| 5,222,018 A | * | 6/1993 | Sharpe et al. | 705/30 |
| 5,239,462 A | * | 8/1993 | Jones et al. | 705/38 |
| 5,274,547 A | * | 12/1993 | Zoffel et al. | 705/38 |
| 5,367,664 A | * | 11/1994 | Magill et al. | 714/16 |
| 5,465,206 A | * | 11/1995 | Hilt et al. | 705/40 |
| 5,557,518 A | * | 9/1996 | Rosen | 705/69 |
| 5,715,314 A | * | 2/1998 | Payne et al. | 705/78 |
| 5,732,400 A | * | 3/1998 | Mandler et al. | 705/26 |
| 5,978,811 A | * | 11/1999 | Smiley | 707/103 |
| 6,088,686 A | * | 7/2000 | Walker et al. | 705/38 |

FOREIGN PATENT DOCUMENTS

| | | | | |
|---|---|---|---|---|
| WO | WO 9703410 | * | 1/1997 | G06F/17/60 |
| WO | WO 9740615 | * | 10/1997 | H04M/15/00 |

OTHER PUBLICATIONS

"Cyberspace Commerce", PC Week, pE1, Oct. 1995.*

Guy, Sandra, "Virtual Shopping", Telephony, vol. 322, Issue 11, p. 18, Mar. 1997.*

Darsa, D., "Lenders Finding More Business on the Internet", Real Estate Finance Today, vol. 14, Issue 15, p. 12, Jul. 1997.*

Sclafane, S., "Credit Report Underwriting Spurs Debate", National Underwriter, V. 100, Issue 49, p. 21+, Dec. 2, 1996.*

Derwent–ACC–No.: 2001–432398; Taylor H. G., Mar. 2001.*

* cited by examiner

| RISK CLASS | AVAILABLE OPEN LINE (CREDIT LINE – EXISTING BALANCE – FROZEN LINE) | OPEN INVOICES DAYS OUTSTANDING | PAYMENT HISTORY (PAST 6 MONTHS) | AUTH$AMT | CLEARINGHOUSE MESSAGE |
|---|---|---|---|---|---|
| 1,2,3,4,5 | YES | NO | NOT APPLICABLE | SALE ≤ OPEN LINE | APPROVAL |
| 1,2,3 | YES | YES<br>ALL < 30 DAYS PAST DUE<br>ANY 30-44 DAYS PAST DUE<br>ANY 30-44 DAYS PAST DUE<br>ANY > 45 DAYS PAST DUE | NOT APPLICABLE<br>NONE > 45 DAYS PAST DUE<br>ANY > 45 DAYS PAST DUE<br>NOT APPLICABLE | SALE ≤ OPEN LINE<br>SALE ≤ OPEN LINE<br>SALE ≤ OPEN LINE<br>SALE ≤ OPEN LINE | APPROVAL<br>APPROVAL<br>PEND<br>REJECT |
| 4 | YES | YES<br>ALL < 15 DAYS PAST DUE<br>ANY 16-30 DAYS PAST DUE<br>ANY 16-30 DAYS PAST DUE<br>ANY > 30 DAYS PAST DUE | NOT APPLICABLE<br>NONE > 30 DAYS PAST DUE<br>ANY > 30 DAYS PAST DUE<br>NOT APPLICABLE | SALE ≤ OPEN LINE<br>SALE ≤ OPEN LINE<br>SALE ≤ OPEN LINE<br>SALE ≤ OPEN LINE | APPROVAL<br>APPROVAL<br>PEND<br>REJECT |
| 5 | YES | YES<br>ALL = NOT PAST DUE<br>ANY 1-15 DAYS PAST DUE<br>ANY 1-15 DAYS PAST DUE<br>ANY > 15 DAYS PAST DUE | NOT APPLICABLE<br>NONE > 15 DAYS PAST DUE<br>ANY > DAYS PAST DUE<br>NOT APPLICABLE | SALE ≤ OPEN LINE<br>SALE ≤ OPEN LINE<br>SALE ≤ OPEN LINE<br>SALE ≤ OPEN LINE | APPROVAL<br>APPROVAL<br>PEND<br>REJECT |
| 1,2,3,4,5 | NO | NOT APPLICABLE | NOT APPLICABLE | SALE-NO OPEN LINE | PEND |

FIG. 5A

| RISK CLASS | AVAILABLE OPEN LINE (CREDIT LINE-EXISTING BALANCE-FROZEN LINE) | OPEN INVOICES DAYS OUTSTANDING | PAYMENT HISTORY (PAST 6 MONTHS) | AUTH$AMT | CLEARINGHOUSE MESSAGE |
|---|---|---|---|---|---|
| 1,2,3 | YES | NO | NONE >15 DAYS PAST DUE | SALE ≤ 10% OVER OPEN LINE | APPROVAL |
| | | | ANY >15 DAYS PAST DUE | SALE ≤ 10% OVER OPEN LINE | REJECT–IDENTIFY AMT OPEN |
| 4 | YES | NO | MAX 1X1–15 DAYS PAST DUE | SALE ≤ 10% OVER OPEN LINE | APPROVAL |
| | | | > 1X1–15 DPD OR WORSE | SALE ≤ 10% OVER OPEN LINE | REJECT–IDENTIFY AMT OPEN |
| 5 | YES | NO | NOT APPLICABLE | SALE ≤ 10% OVER OPEN LINE | REJECT–IDENTIFY AMT OPEN |
| 1,2,3 | YES | YES NONE >15 DAYS PAST DUE | NONE >15 DAYS PAST DUE | SALE ≤ 10% OVER OPEN LINE | APPROVAL |
| | | ANY >15 DAYS PAST DUE | NOT APPLICABLE | SALE ≤ 10% OVER OPEN LINE | REJECT–IDENTIFY AMT OPEN |
| 4 | YES | YES MAX 1X1–15 DAYS PAST DUE | MAX 1X1–15 DAYS PAST DUE | SALE ≤ 10% OVER OPEN LINE | APPROVAL |
| | | > 1X1–15 DPD OR WORSE | NOT APPLICABLE | SALE ≤ 10% OVER OPEN LINE | REJECT–IDENTIFY AMT OPEN |
| 5 | YES | YES NOT APPLICABLE | NOT APPLICABLE | SALE ≤ 10% OVER OPEN LINE | REJECT–IDENTIFY AMT OPEN |
| 1,2,3,4,5 | YES | NOT APPLICABLE | NOT APPLICABLE | SALE >10% OVER OPEN LINE | REJECT–IDENTIFY AMT OPEN |

FIG. 5B

SYSTEM AND METHOD A RISK BASED PURCHASE OF GOODS

CROSS REFERENCE TO RELATED APPLICATION

The present application is a continuation of application U.S. Ser. No. 08/368,290, filed Jan. 4, 1995, now U.S. Pat. No. 5,732,400.

FIELD OF THE INVENTION

The present invention relates to a system and method for enabling buyers and sellers of goods to transact with each other. More particularly, the present invention provides the transactional capability to buyers of goods to have open account trade credit with a plurality of sellers and provides sellers of goods with improved risk assessment and decreased credit costs for buyers of the goods.

BACKGROUND INFORMATION

Corporate procurement processes involving relatively low value purchases, generally defined as less than $25,000, represent a significant percentage of corporate procurement transactions. The processing of such low value transactions, however, is plagued by timely and costly processing of paper requests for quotations (RFQs), purchase orders (POs), invoices and payments.

In corporate to corporate transactions between major trading partners, such as two large corporations well-known to each other, the practice of the selling party providing credit, or trade terms, to the buyer, is firmly embedded in tradition and creates strong relationships between such major trading partners. The same practice, however, creates significant problems where the buying party is not a major trading partner, but is a buyer heretofore unknown to the seller.

The selling party in such a transaction may be unwilling to commit marketing resources to seek and/or close transactions with these anonymous buyers. The selling party also may be reluctant to absorb the cost of analyzing and approving credit exposure, as well as the cost of absorbing credit losses. The expenses associated with expending marketing resources and making informed credit decisions may keep many corporations from exploiting the large but relatively unknown and unpredictable universe of small buyers. The selling corporation must also contend with the problem of collecting payment from numerous small buyers.

In practice, corporate sellers must expend significant resources to make appropriate credit decisions with regard to their minor trading partners.

The above arrangement poses problems for the minor trading partner/buyer as well. The buyer, for example, is often faced with limited access to new vendors and encounters delays in effecting purchases. Moreover, if a vendor to whom the buyer is unknown is unwilling to extend trade credit, the buyer must go through the complex and time-consuming task of obtaining third-party financing (e.g., through a letter of credit, working capital loan or other means) to effect its purchase. However, these methods require negotiations with a lender, usually a bank or a finance company, and carry high transaction-costs. They are therefore inappropriate or uneconomical for small to midsize purchases. As a result, many purchases are made from "the usual" vendor, not from a new but unknown vendor who may actually be the most efficient supplier.

As mentioned earlier, in corporate to corporate procurement transactions, it is customary for the transaction to involve some form of credit. This credit, often referred to as "open account trade credit," is provided by the seller, generally at no charge to the buyer, for a set period of time, normally 30 days. Buyers generally do not explicitly pay for the receipt of open account trade credit and consider this free credit part of the established seller/buyer relationship.

In addition to open account credit terms offered by the selling party, there are several other types of commercial credit options. One option for relatively small purchases is a commercial credit card. Credit cards operate by having the institution issuing the credit card, the merchant bank, provide the cardholder with a revolving line of credit that can be used to buy goods from sellers who accept the credit card. The revolving line of credit allows the cardholder to pay for credit card purchases over a period of time at an interest rate set by the merchant bank. For example, VISA® and MASTERCARD® Bankcard Association cards represent typical consumer credit cards offering a revolving line of credit.

Once a buyer makes a purchase with the credit card, the seller is paid by the merchant bank, less a predetermined service fee, often referred to as an "interchange fee," and the merchant bank then invoices the buyer for payment. As an example of a typical commercial credit card transaction, if a cardholder makes a $1,000 purchase, the merchant bank then pays the seller $1,000 less the amount of the interchange fee. For example, if the issuing institution charges a 2% interchange fee, then the seller would be paid $980, with $20 remaining with the merchant bank, the interchange fee usually being shared with the Bankcard Association.

Another type of commercial credit option is a travel and entertainment card. An example of a consumer travel and entertainment card would be an AMERICAN EXPRESS® card or DINERS CLUB® card. Unlike a credit card, a travel and entertainment card is considered open-ended credit with payment in full due at the time of billing; it does not extend a revolving credit line to the buyer/cardholder. A seller paid by a travel and entertainment card receives the amount of the transaction less a predetermined discount fee, in a manner similar to payment received from a credit card purchase. Often, however, the discount rate for a travel and entertainment card is higher than the discount fee for a credit card because travel and entertainment cards are not finance charge driven.

Credit cards and travel and entertainment cards provide a uniform level of risk assessment to the seller; the seller pays a predetermined interchange fee regardless of the actual credit risk presented by the buyer. Thus, the seller does not receive risked-based pricing from the card-issuing institution representative of the actual credit risk presented by the individual buyer. In addition, credit cards and travel and entertainment cards generally bill cardholders on a regular basis, e.g. monthly, as opposed to invoice billing that is often preferred in commercial transactions.

An emerging area in commercial transactions is electronic communication of financial transactions. Technological advances in computer networks and communication systems have been applied to processing of purchase and credit transactions. Applications of computer technology to financial transactions include Electronic Data Interchange (EDI). EDI provides a standardized format for the communication of business documents between the computers of two companies. Through the use of EDI, a vendor may electronically receive purchase orders directly into an accounting system and transmit invoices back to the vendor. EDI is used by a variety of businesses including manufacturing companies, wholesale and retail trade companies and financial institutions.

Another application of improved computer technology to commercial transactions is the emergence of electronic commerce. Electronic commerce includes the use of electronic networks as electronic marketplaces for business to business or consumer transactions. Electronic commerce services can include electronic brokerages, distributorships or clearinghouses that facilitate trade via electronic interchange media such as a public network (e.g., the Internet), or proprietary access networks. For example, electronic commerce services can include catalog services utilizing electronic networks such as EDI systems, electronic mail and telephone/facsimile connections, as well as CD-ROM technology. Electronic commerce services often operate in real-time and can help reduce distribution costs and help sellers reach new markets.

Electronic commerce generally does not, however, offer financial services to the seller such as payment, settlement, credit assessments of buyers, and collection services. Whereas credit cards are being adapted for consumer electronic commerce, they have not specifically addressed the needs of business to business electronic commerce. Thus, there are no current systems for processing low value corporate to corporate transactions which handle all aspects of the transaction including electronic brokerage, risk management and electronic payment, and also provide risk assessment of buyers tailored to the credit risk presented by individual buyers. Finally, "smart purchasing" via electronic commerce, by which buyers and sellers can structure the most efficient transactions by searching electronically for the best available counterparty, is defeated by the need to rely on traditional techniques for credit analysis and payment before a transaction can be consummated.

SUMMARY OF THE INVENTION

In accordance with a first embodiment of the present invention, a system provides transactional services among sellers and buyers having no previous relationship with each other. The system includes a financial clearinghouse for receiving a registration application for registering buyers with the financial clearinghouse and also for receiving a request for goods or services from the buyers via a computer network or other electronic medium. The financial clearinghouse makes a dynamic real-time risk classification of each buyer utilizing an on-line repository of credit data, including either in-house data or data obtained from a commercial credit service. The financial clearinghouse further determines a risk-based discount rate as a function of the buyer's risk classification to establish a payment amount to a seller by the clearinghouse. The financial clearinghouse also determines a credit line for each buyer.

If the buyer's risk classification is acceptable, the clearinghouse provides a preliminary authorization for a proposed purchase by the buyer and transmits a request for quotation for the desired goods or services, along with the discount rate, to the seller or sellers who are electronically coupled to the financial clearinghouse via the computer network. The financial clearinghouse then receives price quotes from sellers responding to the request. The buyer may then choose to place an order from a particular seller or sellers, for example, by selecting the seller with the lowest price. The financial clearinghouse determines a final credit authorization for the amount of the transaction and then the selected seller or sellers are electronically notified of the buyer's order by the financial clearinghouse. After the seller provides a notice of shipment of the goods, the financial clearinghouse transmits the payment amount to the seller, net of the discount, and also transmits an invoice to the buyer for the purchase price of the transaction.

In accordance with a second embodiment of the present invention, the financial clearinghouse, the buyer and the sellers are coupled to a broker, implemented, for example, as a computer system, which provides an on-line quote and order processing service. In accordance with the second embodiment, the financial clearinghouse can receive a registration application either directly from a potential buyer or via the broker which receives the registration application from the buyer and transmits the application to the financial clearinghouse for registering the buyer with the clearinghouse. Once the registration application is accepted by the financial clearinghouse, the broker can receive a request for goods or services from the buyer. As in the first embodiment of the present invention, the financial clearinghouse, in the processing of the buyer's registration application, utilizes an on-line repository of credit data to determine a risk classification for the buyer. The clearinghouse also determines a credit line for the buyer and a risk-based discount rate as a function of the buyer's risk classification to establish a payment amount to a seller from the clearinghouse if the buyer eventually places an order.

According to the second embodiment of the present invention, once the broker receives a request for goods or services from a buyer, the broker requests a preliminary authorization of the transaction from the financial clearinghouse. If the risk rating of the buyer is acceptable to the financial clearinghouse, the clearinghouse provides an approval message to the broker and the broker transmits the request for the desired goods, along with the discount rate, to the seller or sellers who are electronically coupled to the broker. The broker then receives price quotes from sellers responding to the request and transmits the quotes to the buyer. The buyer may then choose to place an order from a particular seller or sellers, for example, by selecting the seller with the lowest price. The broker submits the buyer's order to the financial clearinghouse for final credit approval. Upon final credit approval by the financial clearinghouse, the clearinghouse notifies the broker and the broker, in turn, notifies the selected seller or sellers to complete the buyer's order. After the seller provides a notice of shipment of the goods, the financial clearinghouse transmits the payment amount, less a discount fee, to the seller and also transmits an invoice to the buyer for the purchase price of the transaction.

The system and method according to the present invention facilitates corporate to corporate trade by providing on-line electronic trade brokerage, credit risk management and electronic payment and collection services which supports an emerging class of electronic intermediaries in wholesale commerce, referred to as electronic commerce services. The credit risk management feature of the present invention provides a dynamic risk evaluation system for obtaining on-the-fly credit evaluations of buyers to facilitate automated ordering and processing of goods, including risk-based pricing for sellers.

The system and method according to-the present invention benefits sellers by providing risk-based pricing, reducing administrative expenses such as credit department, receivables management, and collection expenses, reducing the credit risk normally associated with small buyers, providing rapid payment to the seller and thereby reducing the seller's working capital requirement, and, by servicing a large number of buyers, enabling the seller to tap into new markets.

The system and method according to the present invention benefits buyers by eliminating frustrating and costly delays associated with purchasing from new or occasional sellers, allowing buyers to price shop among sellers via electronic commerce for an optimal price and selection of goods without needing a prior business relationship or to establish separate credit facilities for each seller, reducing the buyer's administrative expenses in submitting RFQs, POs, reconciling invoices and making payments, and providing invoice billing.

The present invention accomplishes these and other objectives by providing a system for electronically: establishing credit approval and an accompanying credit line for the purchase of the desired goods based on a dynamic risk classification of the buyer (which credit line can be used with any participating seller); placing a request for the purchase of goods; placing a purchase order for the goods, the shipment of which triggers payment to the seller of the goods from a financial clearinghouse for the amount of the transaction less a discount fee utilizing risk-based pricing; and invoicing the buyer for payment of the purchase price of the goods by the clearinghouse.

BRIEF DESCRIPTION OF THE DRAWINGS

FIG. 5A shows a chart of exemplary rules for determining a final authorization of a transaction according to the present invention.

FIG. 5B shows another chart of exemplary rules for determining a final authorization of a transaction according to the present invention.

DETAILED DESCRIPTION OF THE INVENTION

Figure 1A:
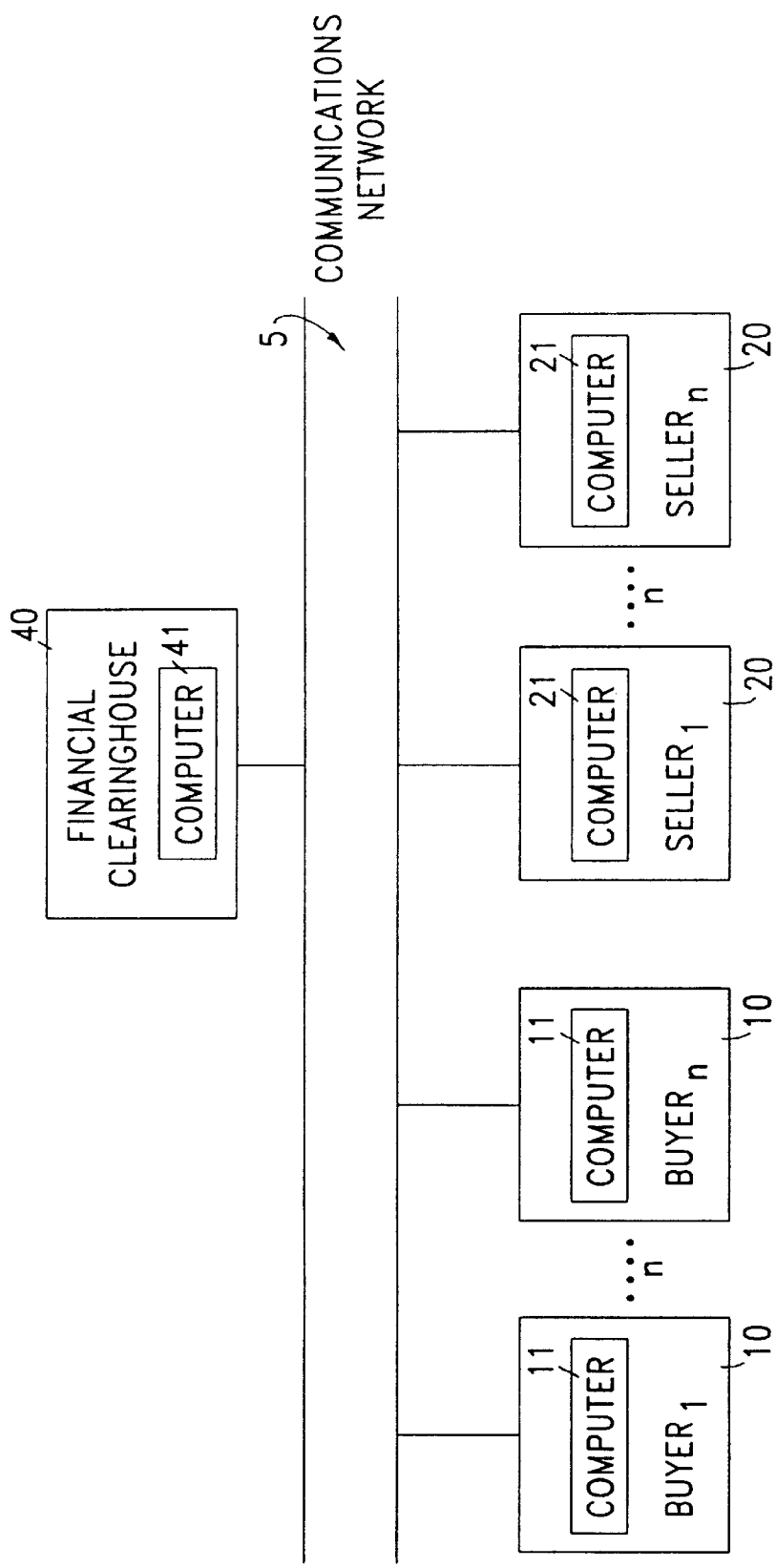
FIG. 1A shows a first embodiment of a system according to the present invention for enabling buyers and sellers of goods to transact with each other.

FIG. 1A shows a first embodiment of the present invention for enabling buyers and sellers to transact with each other. As shown in FIG. 1A, a plurality of buyers 20 and sellers 10 are coupled to a communications network 5. Also coupled to the communications network 5 is a financial clearinghouse 40.

The communications network 5 can be an open network, such as the Internet, or a private access network, such as a local area network (LAN) or a private wide area network (WAN). In order to protect the security of communications on the network 5, the communications network 5 can include a security system. For example, the network 5 can support authenticated, encrypted communications between the buyers 20, sellers 10, and financial clearinghouse 40 using known authentication and data encryption systems. A suitable protocol for communications over the communication network 5 can be, for example, the TCP/IP protocol using conventional IP host addresses and names.

According to the present invention, a buyer 20 desires to purchase goods from a seller 10. The financial clearinghouse 40 provides trade credit to buyers 20 and payment and collection services to sellers 10. The sellers 10 coupled to the financial clearinghouse 40 can be selected by the clearinghouse 40. For example, the financial clearinghouse 40 can use performance criteria with respect to quality and delivery of goods, and/or require that all sellers 10 be capable of communications via EDI in selecting sellers 10. The clearinghouse 40 also provides an order acceptance and processing capability between buyers 20 and sellers 10. Before a buyer 20 can use the financial clearinghouse services to purchase goods, however, the buyer 20 must complete a registration application with the financial clearinghouse 40. The registration application can be completed on-line via the communications network 5, or off-line via, for example, a paper application.

The buyers 20 and sellers 10 are each coupled to the communications network 5 via a buyer computer 21 and a seller computer 11, respectively. Similarly, the financial clearinghouse 40 is coupled to the communications network 5 via a financial clearinghouse computer 41. The buyer computers 21, seller computers 11 and financial clearinghouse computer 41 can be, for example, UNIX® based computer systems. For example, the buyer computers 21 and seller computers 11 can be IBM compatible personal computers or workstations coupled to the communications network 5 via a modem. The financial clearinghouse computer 41 can be, for example, an IBM RS6000 Model C-10 computer system. Communications between the buyer computers 21, seller computers 11 and financial clearinghouse computer 41 are controlled by the communication network 5 protocol, such the as TCP/IP protocol. The format for communications between the clearinghouse 40, sellers 10 and buyers 20 may include, for example, standard ANSI X.12 EDI formats, where applicable. Thus, the system 1A utilizes computer systems and networks to allow buyers 20 and sellers 10 to transact business without any prior relationship between them.

When the financial clearinghouse 40 receives the registration application, the clearinghouse 40 processes the application to determine whether or not to accept the registration application. In making this determination, the financial clearinghouse 40 obtains pertinent credit information on the buyer 20 and determines a risk classification, a discount fee and a credit limit for the buyer 20. The processing of the registration application can be done in real time in response to receipt of the registration application and the processing is shown in detail in FIG. 3.

The risk classification represents the financial clearinghouse's evaluation of the credit risk presented by the buyer 20, based on a variety of factors, including for example: the financial condition of the buyer; the industry condition and outlook; the geographic condition and outlook; the number of years the buyer has been in business; credit reports; any outstanding legal actions; consumer credit report on principals (for small entities); and bank references. This risk classification can be determined by an algorithm in the financial clearinghouse 40 which evaluates some or all of the factors identified above, or can be based on a credit report obtained from a credit reporting agency, such as a Dun &

Bradstreet® report, a TRW® report, or an EQUIFAX® report, or by a combination of the above methods. Thus, each buyer 20 that registers with the clearinghouse 40 obtains an individualized risk classification based on the buyer's particular credit information.

Once the clearinghouse 40 determines the risk classification for the buyer 20, the clearinghouse 40 determines a discount fee based on the risk classification. The discount fee represents the percentage of the dollar value of a transaction by the buyer 20 that the clearinghouse 40 will charge a seller 10 for facilitating the purchase by the buyer 20 through the clearinghouse 40. Thus, the discount fee represents risk-based pricing to the seller 10 based on the credit risk actually presented by the buyer 20.

Also as part of the financial clearinghouse's processing of the buyer's registration application, the clearinghouse 40 determines a credit line for the buyer 20 based on the credit information obtained on the buyer.

Once the buyer's registration application is accepted by the clearinghouse 40 and the risk classification, discount fee and credit limit have been determined, the buyer 20 can request quotes for goods and place purchase orders via the financial clearinghouse 40.

The buyer 20 is now electronically coupled to and registered with the clearinghouse 40, but may have no prior relationship with the sellers 10. The buyer 20 then issues a RFQ to the clearinghouse 40 for goods or services from sellers 10. The clearinghouse 40 receives the request and assigns a transaction ID that accompanies all messages associated with this transaction.

Upon receiving the RFQ, the financial clearinghouse 40 performs a request for risk rating (RRR) to determine preliminary authorization for financial clearinghouse 40 financing of the potential transaction. The RRR, for example, verifies that the buyer 20 is registered with the financial clearinghouse 40 and also provides the risk-based discount fee that has been determined for the buyer 20. If the RRR is acceptable, then the clearinghouse 40 transmits the RFQ to the seller or sellers 10 via the communications network 5.

In response to the RFQ message, the seller or sellers 10 provide quotes for the requested goods to the clearinghouse 40. The clearinghouse 40 gathers all of the quotes and forwards them to the buyer 20. The buyer 20 identifies the desired goods and sellers, based on the responsive quotes, and the buyer 20 sends a PO to the clearinghouse 40. After receiving the PO, the clearinghouse 40 performs a hard authorization for final authorization of the transaction in the amount of the PO. The hard authorization, for example, involves a review of the risk classification and available credit line of the buyer 20 to determine whether the clearinghouse 40 should authorize the transaction. Exemplary rules for responding to the hard authorization are shown in FIGS. 5A and 5B.

Once the clearinghouse 40 authorizes credit approval for the amount of the PO, the PO is transmitted to the identified seller or sellers 10. The seller 10 either accepts or rejects the PO. If the seller 10 does not accept the PO, then the clearinghouse 40 allows for negotiations between the buyer 20 and seller 10, either on-line via the communications network 5 or off-line, e.g., via a meeting or written correspondence. If the negotiations are conducted off-line, the process can allow for human intervention and then a subsequent resumption of electronic processing of the transaction by the financial clearinghouse 40. Any modifications that increase the amount of the PO must be re-authorized by the clearinghouse 40. After the seller 10 accepts the PO, the seller 10 ships the goods to the buyer 20 and transmits a notice of shipment (NOS) to the financial clearinghouse 40.

Upon receipt of the NOS, the clearinghouse 40 checks the NOS against the PO to ensure shipment of the proper goods in accordance with the PO and provides for either on-line or off-line dispute resolution if there is a discrepancy. The clearinghouse 40 then invoices the buyer 20 for the amount of the PO and creates an account receivable. Accounts receivable can be, for example, net 30 days. At the same time, an account payable to the seller 10 is also established in the amount of the PO less the risk-based discount fee retained by the financial clearinghouse 40. The financial clearinghouse 40 also can provide for disputes against the seller 10 for nonperformance and/or returns by the buyer 20 by either an on-line process via the communications network 5 or an off-line process via a meeting or written correspondence.

If the negotiations are conducted off-line, the process can allow for human intervention and then a subsequent resumption of electronic processing of the transaction by financial clearinghouse 40.

Figure 1B:
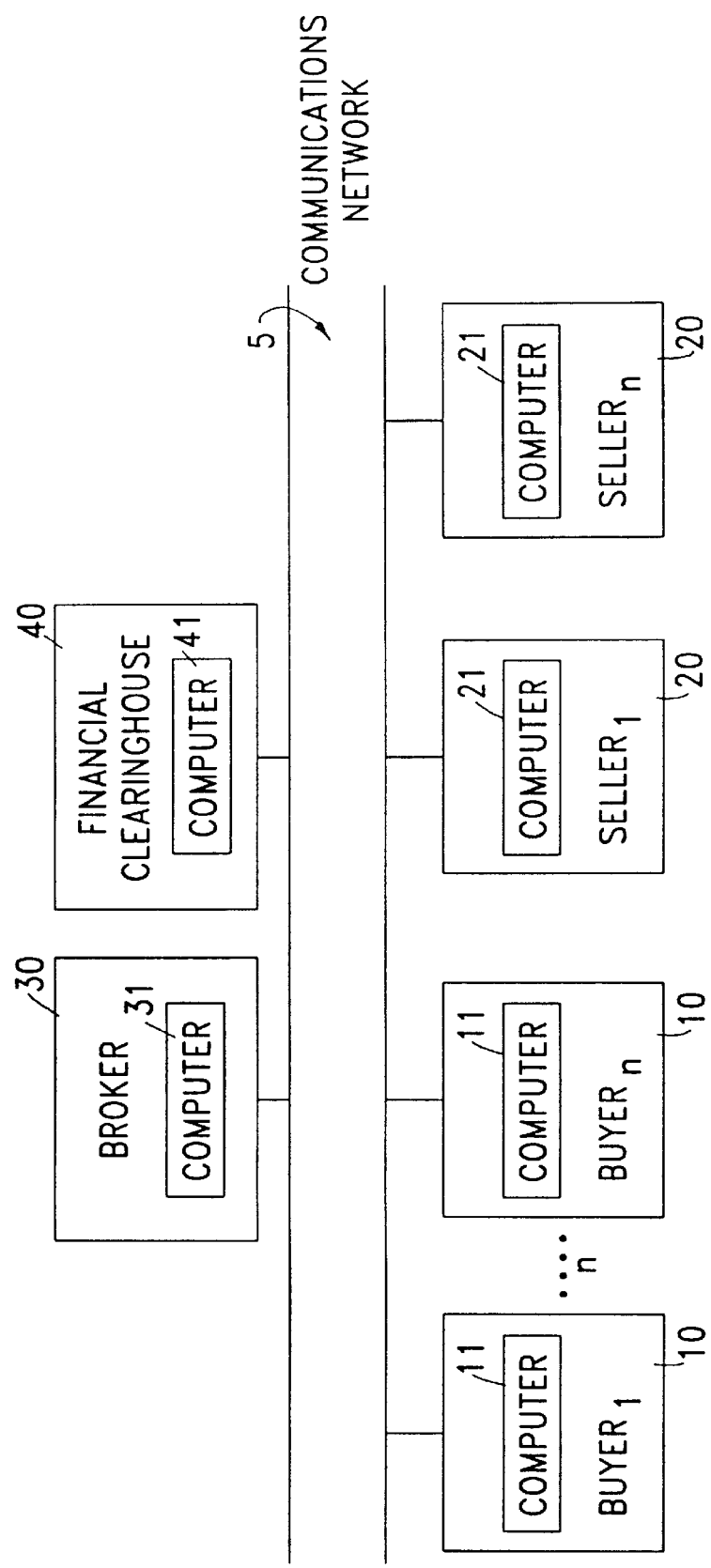
FIG. 1B shows a second embodiment of a system according to the present invention for enabling buyers and sellers of goods to transact with each other, including a broker.

Referring now to FIG. 1B, a second embodiment of the present invention is shown for enabling buyers and sellers to transact with each other. In FIG. 1B, a plurality of buyers 20, sellers 10 and a financial clearinghouse 40 are coupled to a communications network 5. Also coupled to the communications network 5 is a broker 30 that provides an on-line order acceptance and processing capability between buyers 20 and sellers 10. The functions provided by the broker 30 can be implemented, for example, as a computer system. Multiple brokers 30 can be coupled to a single financial clearinghouse 40. For example, each broker 30 associated with a clearinghouse 40 can be assigned a unique number to be used in the exchange of EDI messages between the broker 30 and the financial clearinghouse 40. The elements shown in FIG. 1B that have the same reference numerals as the elements shown in FIG. 1A are the same or similar element and will not be described in detail for FIG. 1B.

According to the second embodiment of the present invention, a buyer 20 desires to purchase goods from a seller 10. The financial clearinghouse 40 is coupled to the sellers 10 and buyers 20, via the broker 20, for providing trade credit and payment and collection services. Sellers 10 can be identified and selected by the broker 30 as a function of performance criteria with respect to quality and delivery of goods, and/or requiring that all sellers 10 be capable of supporting EDI communications. Before a buyer 20 can use the financial clearinghouse services to purchase goods, however, the buyer 20 must complete a registration application with the financial clearinghouse 40.

The buyers 20 and sellers 10 are each coupled to the communications network 5 via a buyer computer 21 and a seller computer 11, respectively. Similarly, the broker 30 and the financial clearinghouse 40 are coupled to the communications network 5 via a broker computer 31 and a financial clearinghouse computer 41. The broker computer 31 can be, for example, a UNIX® based computer system or other system, for example, an IBM compatible personal computer or a workstation coupled to the communications network 5 via a modem. Communications between the buyer computers 21, seller computers 11, broker computer 31 and financial clearinghouse computer 41 are controlled by the communication network 5 protocol, such as the TCP/IP protocol. The format for communications between the clearinghouse 40, broker 30, sellers 10 and buyers 20 may include, for example, standard ANSI X.12 EDI formats. Thus, the system 1B utilizes computer systems and networks to allow buyers 20 and sellers 10 to transact business without any prior relationship between them via a broker 30.

When the financial clearinghouse 40 receives the registration application, either via the broker 30 over the communications network 5 or directly from the buyer 20 via a paper application, the clearinghouse 40 processes the application to determine whether or not to accept the registration application. In making this determination, the financial clearinghouse 40 obtains pertinent credit information on the buyer 20 and determines a risk classification, a discount fee and a credit limit for the buyer 20 in the same manner as described with respect to the first embodiment of the present invention shown in FIG. 1A.

After completing a registration application which is accepted by the financial clearinghouse 40, the buyer 20 is registered with the clearinghouse 40, but may have no prior relationship with the sellers 10. The buyer 20 can then issue a request for quotation (RFQ) to the broker 30 for goods or services from a seller or sellers 10. The broker 30 receives the RFQ in electronic form and assigns a transaction ID that accompanies all messages associated with this transaction.

Upon receiving the RFQ, the broker 30 transmits a request for risk rating (RRR) to the financial clearinghouse 40 to determine preliminary authorization for clearinghouse 40 financing of the potential transaction. The RRR, for example, verifies to the broker 30 that the buyer 20 is registered with the financial clearinghouse 40 and also provides the discount fee that has been determined for the buyer 20 by the financial clearinghouse 40. The financial clearinghouse 40 provides a response to the RRR to the broker 30, which may be an ACCEPT, REJECT or PEND message. If the RRR is determined to be an ACCEPT by the clearinghouse 40, then the broker 30 transmits the RFQ 40 the seller or sellers 10 via the communications network 5.

In response to the RFQ message, the seller or sellers 10 provide quotes for the requested goods to the broker 30. The broker 30 gathers all of the quotes and forwards them to the buyer 20. The buyer 20 identifies the desired goods and sellers based on the quotes and the buyer 20 sends a purchase order (PO) to the broker 30. After receiving the PO, the broker 30 requests a hard authorization for final authorization of the transaction in the amount of the PO from the financial clearinghouse 40. The hard authorization, for example, reviews the risk classification and available credit line of the buyer 20 to determine whether the clearinghouse 40 should authorize the transaction. The response to the hard authorization request by the broker 30 can be an ACCEPT, REJECT or PENDING message.

Once the clearinghouse 40 provides an ACCEPT message to the broker 30 and thereby authorizes credit approval for the amount of the PO, the broker 30 transmits the PO to the identified seller or sellers 10. The seller 10 either accepts or rejects the PO. If the seller 10 does not accept the PO, then the broker 30 allows for negotiations between the buyer 20 and seller 10, either on-line via the communications network 5 or off-line, e.g., via a meeting or written correspondence. Any modifications that increase the amount of the PO must be re-authorized by the clearinghouse 40. After the seller 10 accepts the PO, the seller 10 ships the goods to the buyer 20 and transmits a notice of shipment (NOS) to the broker 30.

Upon receipt of the NOS, the broker 30 checks the NOS against the PO to ensure shipment of the proper goods in accordance with the PO and provides for dispute resolution if there is a discrepancy. After the broker 30 verifies the NOS, the clearinghouse 40 invoices the buyer 20 for the amount of the PO. Accounts receivable can be, for example, net 30 days. At the same time, accounts payable to the seller or sellers 10 are also established in the amount of the PO less the discount fee retained by the financial clearinghouse 40. The broker 30 can handle disputes against the seller 10 for nonperformance and returns by the buyer 20.

Figure 2:
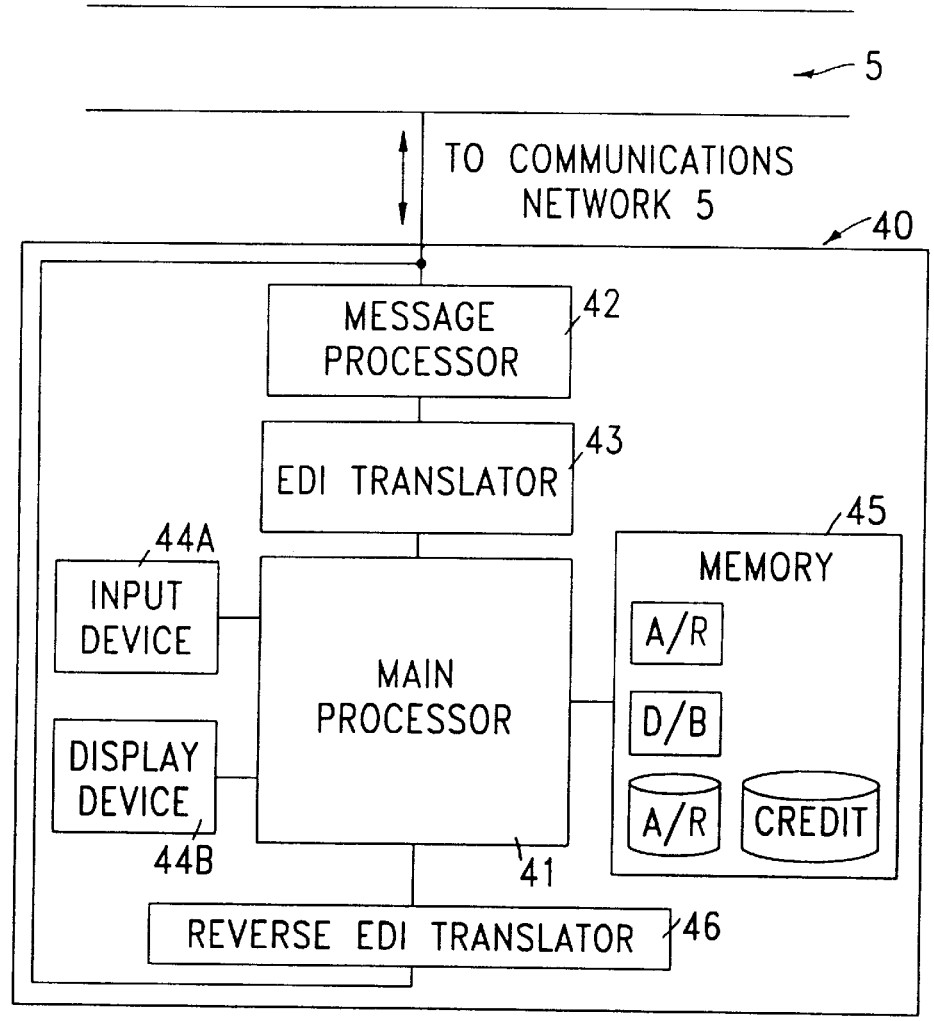
FIG. 2 shows a financial clearinghouse according to the present invention.

FIG. 2 shows a financial clearinghouse 40 according to an embodiment of the present invention. The financial clearinghouse 40 is electronically coupled to the communications network 5 and includes a message processor 42, an EDI translator 43, a main processor 41, an input device 44A, a display device 44B, a memory 45, and a reverse EDI translator 46.

The message processor 42 receives messages from a buyer 20 or seller 10, in accordance with the first embodiment of the present invention, or from a broker 30, in accordance with the second embodiment of the present invention. The message processor 42 can be, for example, an IBM RS6000 Model 250 computer system. There is a firewall between the message processor 42 and the financial clearinghouse main processor 41. Thus, for example, the message processor 42 receives an electronic message from a broker 30 via the communications network 5. The message processor 42 transmits the received message to the EDI translator 43 so that the message can be translated from its EDI format to an ASCII format that can be read by the main processor 41. The EDI translator can be, for example, a PREMENOS® EDI translator.

Once the message is translated into ASCII format, the main processor 41 processes the message. The main processor 41 can be, for example, an IBM RS6000 Model C-10 computer system. Connected to the main processor 41 is a memory 45 used to store the data operated upon by the present invention. The memory 45 also stores an accounting package 47 for billing, collection and payment purposes, for example, the REALWORLD® accounting package or other known accounting package. Execution of the instructions of the accounting package 47 by the main processor 41 will establish an accounts receivable (A/R) database in the memory 45 for storing pertinent data regarding amounts paid by the buyers 20 and due to sellers 10 and brokers 20, and also historical A/R data. The memory 45 also includes a database package 48, such as the ORACLE® package or other known database package. The database package 48 is programmed to provide instructions to the main processor 41 for the form of input of information into the financial clearinghouse 40, and also to provide the rules for the credit analysis performed by the financial clearinghouse (e.g. the risk classification, discount fee, and the credit line). The database package 48 also will establish a credit database in the memory 45 for storing pertinent credit data, such as risk rating, discount fee and credit limit for each buyer 20 that is registered with the financial clearinghouse 40.

In addition, an input device can be coupled to the main processor 41. The input device 44A can be, for example, a keyboard and/or a mouse, or any other device capable of receiving instructions from a user. The input device 44A can also be a link to another computer system or network for, e.g., accessing data stored in one or more storage devices located at various locations within a computer network. A display device 44B also can be coupled to the main processor 41 and can be any output device that is capable of displaying data to a user.

When a message has been processed by the main processor 41, and in response a message is to be transmitted from the financial clearinghouse to a buyer 20, seller 10 or broker 30, then the message output from the main processor 41 is translated by a reverse EDI translator 46. The reverse EDI translator, for example, a PREMENOS® Reverse EDI Translator, translates the main processor 41 message from its ASCII format back to the EDI format which is used for communications via the communications network 5.

The financial clearinghouse 40 can support either paper invoicing, electronic invoicing or electronic debit for billing and payment. Electronic invoicing, for example, can be accomplished by the use of standard EDI messages. Automatic debiting for payment from the buyer 20 to the financial clearinghouse 40 can be accomplished, for example, by the use of standard Authorized Clearing House ("ACH") debit transactions. Similarly, the financial clearinghouse 40 can support check, ACH or EFT options for payments to the sellers 10.

Figure 3A:
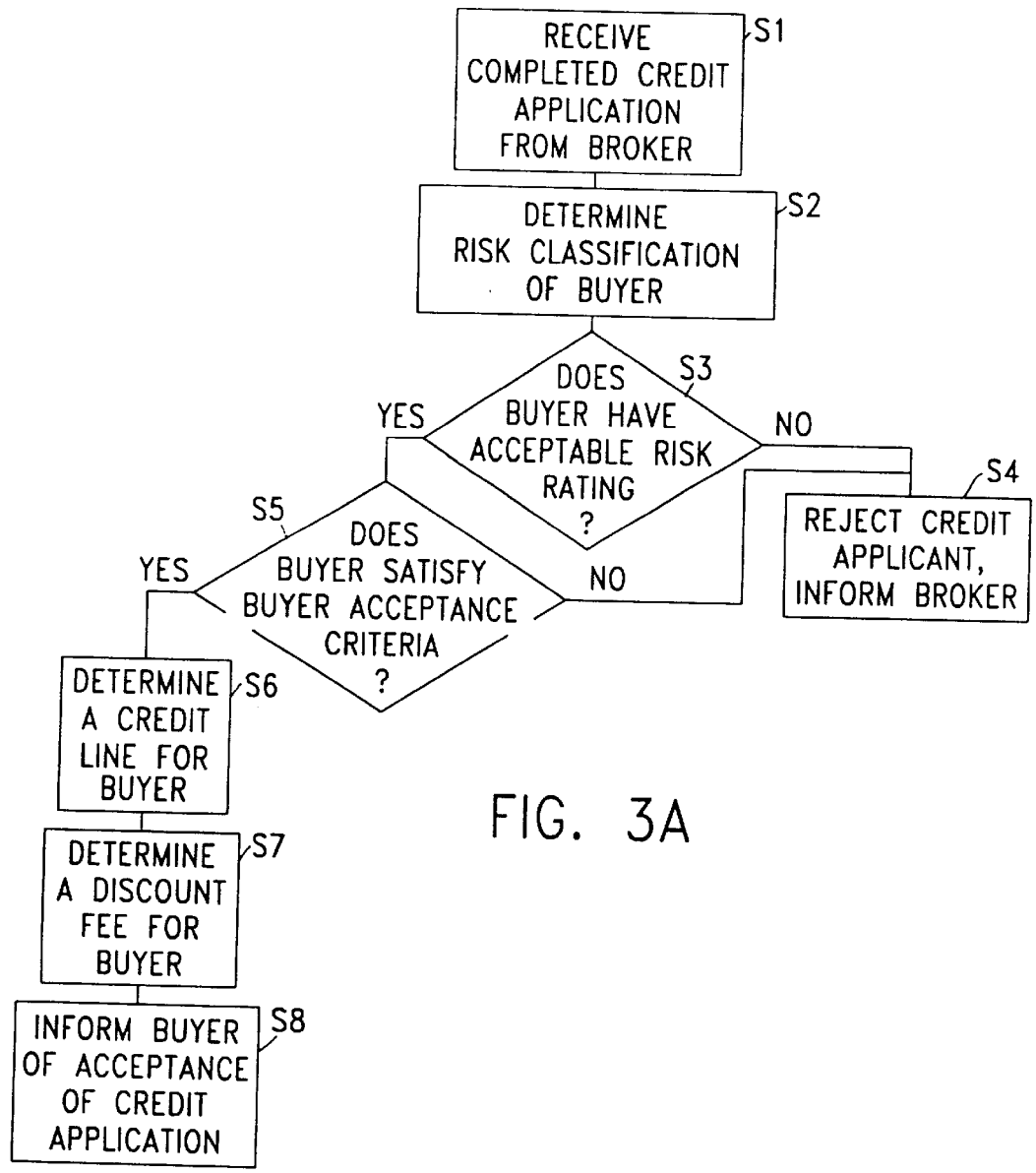
FIG. 3A is an illustrative flow chart showing the processing of a credit application, including determining a dynamic risk classification of a buyer, according to the second embodiment of the present invention.
Figure 3B:
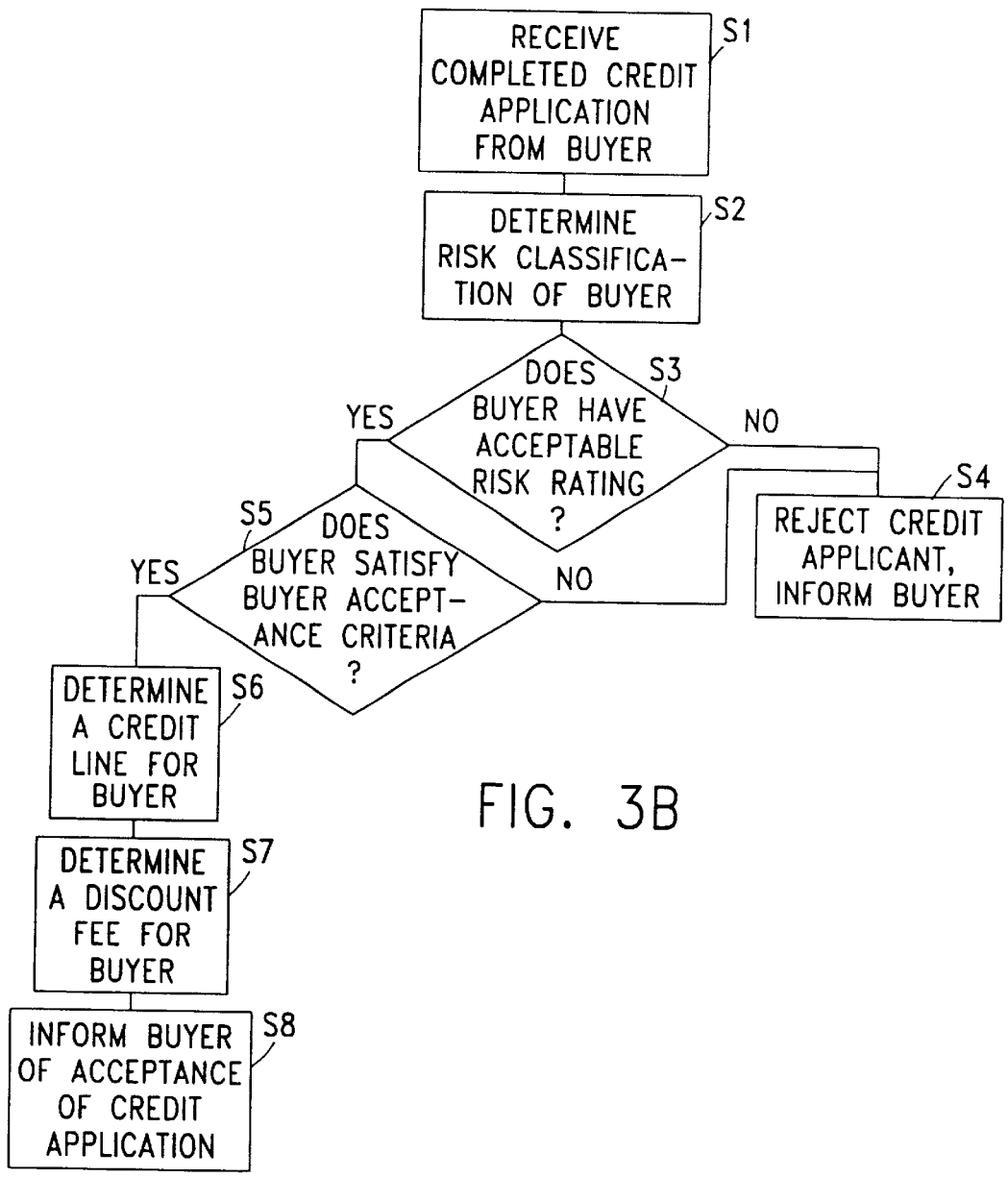
FIG. 3B is an illustrative flow chart showing the processing of a credit application, including determining a dynamic risk classification of a buyer, according to the first embodiment of the present invention.

FIGS. 3A and 3B each show an illustrative flowchart of the processing of a registration application from a potential buyer 20 by the financial clearinghouse 40 according to the present invention. In step Si, the financial clearinghouse receives a completed registration application from the buyer 20. The completed registration application can be received by the clearinghouse 40 in several ways. According to the first embodiment of the present invention, the buyer's computer 21 establishes a connection with the financial clearinghouse computer 41 and the buyer 20 is prompted to provide the required information, for example, via a pull-down screen. According to the second embodiment of the present invention, the buyer's computer 21 establishes a connection with the broker's computer 31 and the buyer 20 is prompted to provide the required information. The broker 30 then forwards the completed application to the financial clearinghouse 40. Alternatively, the buyer 20 could complete the credit application off-line, such as by a paper application mailed to the financial clearinghouse 40 for processing.

The type of information required for the credit application can include, for example, general business information, business demographics information, and purchase order information. General business information includes, for example, the buyer's name, address, phone number and authorized officials. Business demographics information includes, for example, the type of business structure (e.g., public corporation, private corporation, government, etc.), the nature of the business, annual sales, years in business and bank references. Purchase order information includes, for example, an invoice mailing address, an accounts payable contact and purchase order requirements.

Once the financial clearinghouse 40 receives the registration application, in step S2 the financial clearinghouse determines a risk classification of the buyer. As discussed earlier, the risk classification is based on a variety of factors including for example: the financial condition of the buyer; the industry condition and outlook; the geographic condition and outlook; the number of the buyer's years in business; credit reports; any outstanding legal actions; consumer credit report on principals (for small entities); and bank references. The risk classification represents the financial clearinghouse's evaluation of the credit risk presented by each individual buyer 20. In addition, "artificial intelligence" or "neural network" systems can be incorporated into the risk classification determination to identify transactions or trends which depart from the general trend for the buyer 20, or which suggest a pattern of declining credit quality.

The risk classification can be, for example, a numerical value of 1 through 5, wherein risk classification 1 represents a low credit risk, risk classification 2 represents a moderate credit risk, risk classification 3 represents an average credit risk, risk classification 4 represents significant credit risk and risk classification 5 represents high credit risk. A risk classification of 0 indicates that the buyer is bankrupt or a debtor in possession. The risk classification can be determined as a function of the factors mentioned above, based on information provided by the buyer and on-line credit information obtained from commercial credit reporting services, such as TRW®, EQUIFAX® and Dun & Bradstreet® credit services. The risk classification can also be obtained on-line directly from a commercial credit report, such as a Dun & Bradstreet® credit report.

In step S3, the financial clearinghouse 40 determines whether the buyer has an acceptable risk classification. For example, if the buyer 20 has been in business for less than three years, has no credit score report from a recognized credit reporting agency, has a risk classification of 0, has no reported trade references, or has a risk classification of 5 in conjunction with an unsatisfactory payment history rating, then the buyer 20 has an unacceptable risk classification. If one of the above conditions is satisfied, the financial clearinghouse 40 will reject the application in step S4 and inform the broker of the rejection. Otherwise, the buyer's risk classification is acceptable and the financial clearinghouse continues processing the registration application.

In step S5, buyer acceptance criteria are applied against the buyer's risk classification. Thus, even if the buyer 20 passes step S4, the registration application can still be rejected by the financial clearinghouse 40 if, for example, the buyer 20 is engaged in illegal activities, operates within certain designated industries, or is located in a country with which commerce is restricted pursuant to government regulations. If the buyer 20 fails to pass the buyer acceptance criteria, the registration application is rejected in step S4. If the buyer acceptance criteria are satisfied, however, then the financial clearinghouse 40 determines a credit line for the buyer 20 in step S6.

The credit line established for the buyer 20 in step S6 can be determined as a function of the average high credit extended to the buyer 20 and the buyer's risk classification score. Table 1 shows a set of exemplary rules for establishing the credit limit for a buyer 20 based on average high credit and risk classification.

TABLE 1

| RISK CLASS. | FACTOR |
| --- | --- |
| 1 | 3 |
| 2 | 2 |
| 3 | 2 |
| 4 | 1 |
| 5 | 1 |

Thus, for a buyer 20 with a risk classification 1, the average high credit value for the buyer 20 is multiplied by 3 to determine the amount of the buyer's credit line. Similarly, for a risk classification 5, the average high credit value is multiplied by 1 to determine the credit limit. The average high credit value is a measure of the credit balances historically carried by the buyer 20 and is readily determinable by an algorithm of the financial clearinghouse 40 based on buyer-supplied information and external credit sources, or the value can be obtained directly from a commercial credit report. Alternatively, other information can be used to set the credit limit, such as median high credit. The financial clearinghouse 40 also can set a cap on the credit line to be extended to any buyer 20, regardless of the buyer's risk classification.

Both the credit line and the risk classification can have associated expiration dates to ensure that the buyer's creditworthiness remains current. Extensions of new credit will not be automatically made, for example, once the expiration date is reached. The financial clearinghouse 40 can instead automatically select buyers 20 with expiring credit limits or risk classifications, automatically review and adjust the values or terminate the buyer's credit.

In step S7, the financial clearinghouse determines a discount fee for the buyer. The discount fee can be determined as a function of the risk classification, as shown by Table 2.

TABLE 2

| RISK CLASS. | DISC. % |
|---|---|
| 1 | X |
| 2 | X + 1 |
| 3 | X + 2 |
| 4 | X + 4 |
| 5 | X + 6 |

Thus, for example, for a buyer 20 with a risk classification 1, the discount fee can be within a selectable range X, such as 2%–4%. Similarly, for a buyer 20 with a risk classification 5, the discount fee can be in a selectable range X+6, such as 8%–10%. For example, a $1,000 purchase by a buyer 20 would result in the seller 10 being paid $980 ($1,000–$20) for a risk classification 1 buyer and an X=2% discount fee, but only paid $920 ($1,000–$80) if the buyer 20 had a risk classification 5 and an 8% (8%=X+6%, where X=2%) discount fee. Thus, the discount fee determined by the present invention is a risk-based fee reflective of the credit risk presented by each buyer 20. In step S8, the buyer 20 is informed of acceptance of the credit application by the financial clearinghouse 40.

Figures 1, 4A:
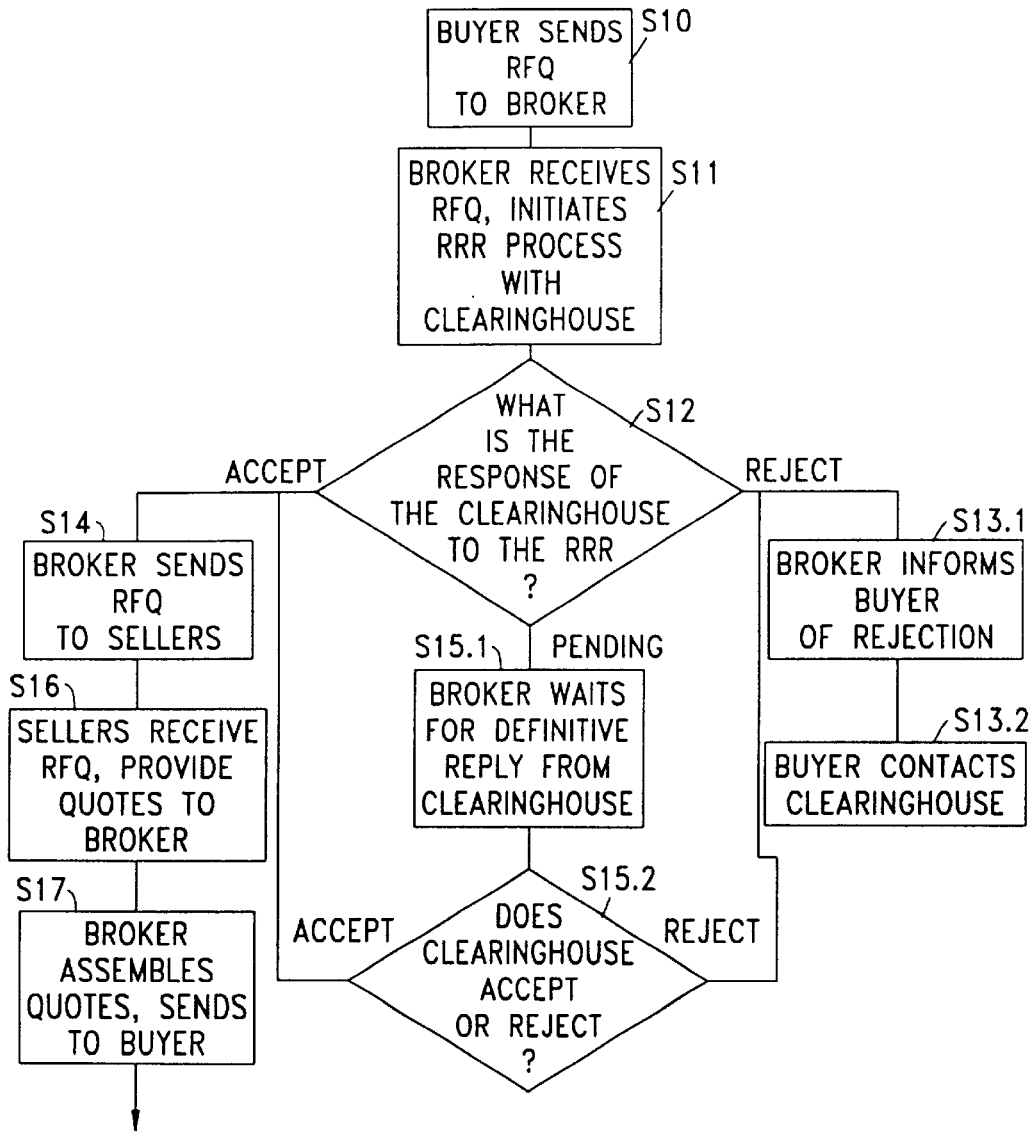
FIG. 4A is an illustrative flow chart showing a buy/sell transaction according to the second embodiment of the present invention.
Figures 2, 4A:
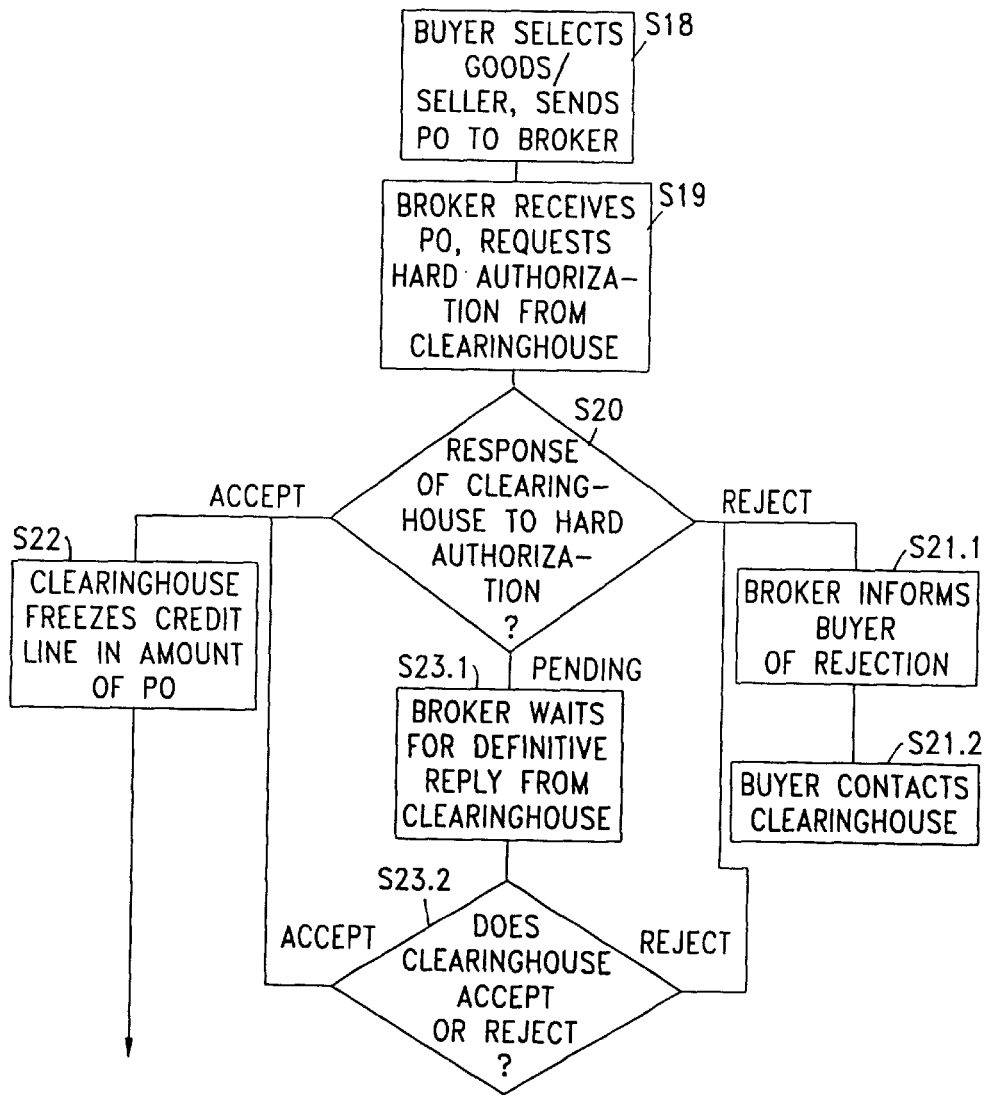
Figures 3, 4A:
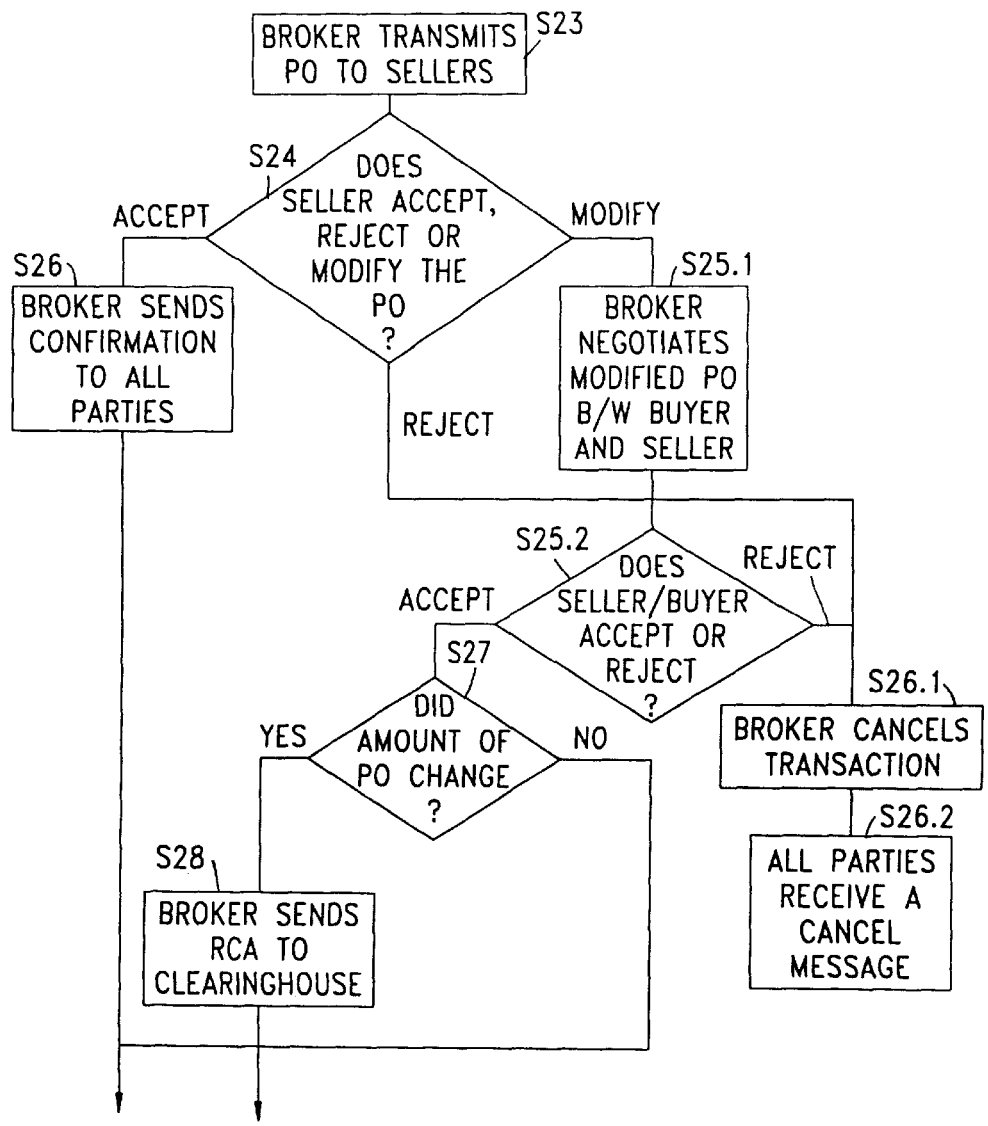
Figures 4, 4A:
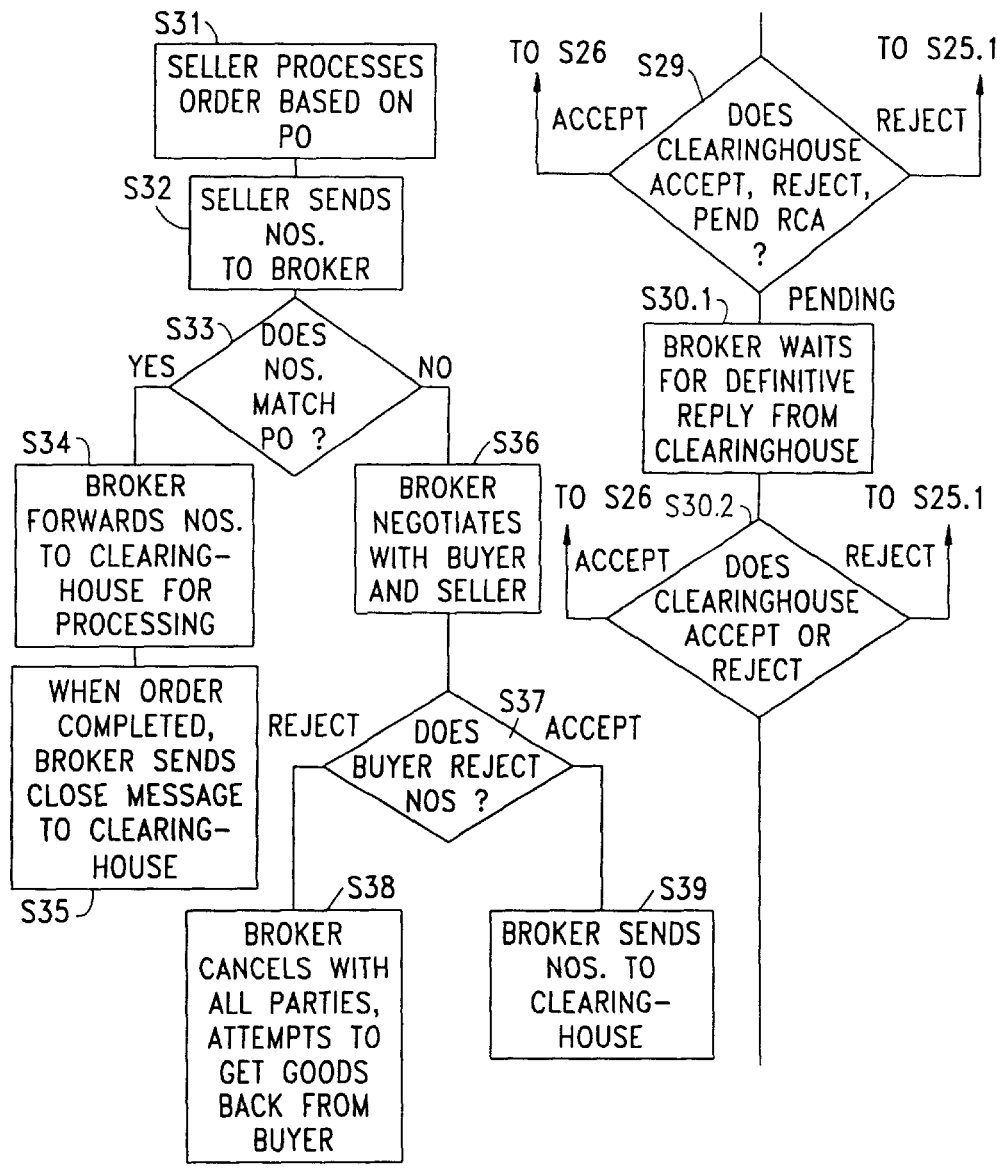

FIG. 4 is an illustrative flowchart of a buy/sell transaction according to the second embodiment of the present invention. The flowchart illustrates the steps performed by the system following step S8 shown in FIG. 3 (i.e., after the buyer 20 is informed of acceptance by the financial clearinghouse 40).

Once a buyer 20 has registered with the financial clearinghouse 40, in step S10 the buyer 20 sends a request for quotation (RFQ) to the broker 30. The broker 30 receives the RFQ in step S11 and then sends a request for risk rating (RRR) message to the financial clearinghouse 40. In response to the RRR message from the broker 30, in step S12 the financial clearinghouse 40 responds with an ACCEPT, REJECT OR PENDING message to the broker 30.

If the clearinghouse 40 provides a REJECT message indicating that the buyer 20 has been rejected by the clearinghouse 40 for credit, then in step S13.1 the broker 30 sends a message to the buyer 20 informing the buyer of the rejection. In step S13.2, the buyer 20 can contact the clearinghouse 40 directly regarding the rejection. If the clearinghouse 40 provides an ACCEPT message indicating that the buyer 20 is registered with the clearinghouse 40, then in step S14 the broker 30 transmits the RFQ to the appropriate seller or sellers 10.

The clearinghouse 40 provides a PENDING message when the RRR is received at a time when the clearinghouse 40 is not available, e.g., the financial clearinghouse computer 41 is down, or if there is an error detected in the RRR message. In step S15.1, the broker 30 waits for the clearinghouse 40 to process the RRR and provide either an ACCEPT or REJECT message. In step S15.2, the broker 30 receives either an ACCEPT or REJECT message from the financial clearinghouse 40. If the message is a REJECT, then the broker 30 informs the buyer 20 of the rejection via step S13.1, and the buyer can contact the clearinghouse regarding the rejection in step S13.2. If the message is an ACCEPT, however, then the broker transmits the RFQ to the appropriate seller or sellers 10 in step S14.

In step S16, the seller or sellers 10 receive the RFQ and in response, transmit a quotation for the goods to the broker 30. In step S17, the broker 30 assembles all of the received quotes and transmits the quotes to the buyer 20. In step S18, the buyer 20 selects the desired goods and the seller or sellers 10 from whom the buyer 20 wants to purchase the goods. Then, the buyer 20 sends a purchase order (PO) to the broker 30. The broker 30 receives the PO from the buyer 20 in step S19 and transmits a request for a hard authorization to the financial clearinghouse 40.

The hard authorization represents the financial clearinghouse's final authorization for financing the transaction between the buyer 20 and the seller or sellers 10 in the amount of the PO. The financial clearinghouse 40 processes the hard authorization in step S20 and responds with an ACCEPT, REJECT or PENDING message to the broker 30. Exemplary of the rules used by the financial clearinghouse 40 to determine the response to the hard authorization request are shown in FIGS. 5A and 5B.

If the financial clearinghouse 40 provides the broker 30 with a REJECT message in response to the hard authorization request, the broker 30 informs the buyer 20 of the rejection in step S21.1 and the buyer 20 can contact the financial clearinghouse 40 directly, either on-line or off-line, regarding the rejection in step S21.2. If the financial clearinghouse 40 provides the broker 30 with an ACCEPT message in response to the hard authorization request, the clearinghouse 40 freezes the credit line of the buyer 20 in the amount of the PO in step S22. Once the financial clearinghouse 40 freezes the credit line of the buyer 20, the amount of the line that is frozen cannot be used for other transactions by the buyer 20 until the freeze is lifted. Thus, the buyer 20 can only seek further clearinghouse financing with any remaining portion of the credit line ("the open-line").

If the financial clearinghouse 40 provides the broker 30 with a PENDING message in response to the hard authorization request, in step S23.1 the financial clearinghouse conducts additional on-line or off-line processing to determine whether to accept or reject the request, and, the broker 30 waits for the subsequent ACCEPT or REJECT message. If the clearinghouse 40 provides a REJECT message, the broker 30 informs the buyer 20 of the rejection in step S21.1 and the buyer 20 can directly contact the financial clearinghouse 40 in step S21.2. If the clearinghouse provides an ACCEPT message, however, then the clearinghouse freezes the credit line of the buyer 20 in the amount of the PO in step S22.

After the broker 30 receives an ACCEPT message from the financial clearinghouse 40 in response to a hard authorization request, the broker 20 transmits the PO to the appropriate seller or sellers 10 in step S23. In step S24, the seller or sellers 10 process the PO and responds to the broker 30 with an ACCEPT, REJECT or MODIFY message.

If the seller or all sellers 10 provide the broker 30 with a REJECT message, the broker 30 cancels the transaction in step S26.1 and the buyer 20, the seller or sellers 10, and the financial clearinghouse 40 receive a CANCEL message in step S26.2. If the seller or sellers 10 provide the broker 30 with an ACCEPT message in response to the PO, then the broker 30 sends a CONFIRMATION message to all parties in step S26.

If the seller or sellers 10 provide the broker 30 with a MODIFY message in response to the PO, however, then the broker 30 negotiates a modified PO between the buyer 20 and seller or sellers 10 in step S25.1. Step S25.1 can be done either on-line via the communication network 5 or off-line. If the negotiations are conducted off-line, the process can allow for human intervention and then a resumption of electronic processing of the transaction by financial clearinghouse 40. In step S25.2, the buyer 20 and the seller or sellers 10 either ACCEPT or REJECT the modified PO. If the broker 30 receives a REJECT message from either party, then the broker 30 cancels the transaction in step S26.1 and all parties receive a CANCEL message in step S26.2. If the broker 30 receives an ACCEPT message from both parties, however, then in step S27 the broker determines whether the amount of the PO changed. If the amount of the PO changed, then in step S28 the broker 30 transmits a request to change authorization (RCA) message to the financial clearinghouse 40 which may include an authentication from the buyer 20. If the amount of the PO did not change, then the broker 30 sends a CONFIRMATION message to all parties in step S26.

In step S29, the financial clearinghouse 40 provides the broker 30 with an ACCEPT, REJECT or PENDING message in response to the RCA message from the broker 30. If the broker receives a REJECT message from the financial clearinghouse 40, then the broker 30 negotiates a modified PO between the buyer 20 and seller 10, starting with step S25.1. The negotiations between the buyer 20 and seller 10 via the broker 30 can continue until the modified PO is agreed upon and a time limit on the hard authorization APPROVAL provided by the financial clearinghouse 40 does not expire. If the broker 30 receives an ACCEPT message from the financial clearinghouse 40 in response to the RCA message from the broker 30, the broker 30 sends a CONFIRM message to all parties in step S26.

If the broker 30 receives a PENDING message from the financial clearinghouse 40 in response to the RCA message from the broker 30, the broker 30 waits for either an ACCEPT or REJECT message from the financial clearinghouse 40 in step S30.1 while the clearinghouse processes the changed PO, either on-line or off-line. If the broker 30 receives a REJECT message in step S30.2, then the broker 30 negotiates a modified PO between the buyer 20 and seller 10 starting with step S25.1. If the broker 30 receives an ACCEPT message in step S30.2, however, then broker 30 sends a CONFIRM message to all the parties in step S26. The financial clearinghouse 40 adjusts the amount of the frozen credit line in response to the amount of the modified PO.

Once the seller or sellers 10 receive the CONFIRM message from the broker 30, the seller or sellers 10 begin processing the agreed upon PO in step S31. After the seller or sellers 10 complete the buyer's PO, in step S32 the seller or sellers 10 transmits a notice of shipment (NOS) to the broker 30. The seller or sellers 10 can transmit a complete NOS or a partial NOS. In step S33, the broker 30 compares the NOS received from the seller or sellers 10 with the PO to determine whether the NOS matches the PO and represents a complete NOS or a partial NOS. If the NOS received from the seller or sellers 10 matches the PO and represents either the complete amount or a partial amount of the PO, then in step S34, the NOS is transmitted to the financial clearinghouse 40 for processing against the buyer's credit line. As the financial clearinghouse 40 processes the NOS, the credit line of the buyer 20 is reduced by the amount of the NOS. The credit line is restored as the buyer 20 pays the resulting invoice from the clearinghouse 40.

In step S35, the broker 30 determines whether the PO has been completed by the seller or sellers 10, which may take multiple NOSs. When the PO is complete, the broker 30 sends a CLOSE PO message to the financial clearinghouse 40.

If there is a discrepancy between the NOS and the PO, in step S36 the broker 30 negotiates the NOS dispute between the buyer 20 and the seller or sellers 10 so that the buyer 10 either ACCEPTS or REJECTS the NOS from the seller or sellers 10 in step S37. If the buyer 10 REJECTS the NOS in step S37, then the broker 30, in step S38, cancels the transaction, sends a CANCEL message to all of the parties (buyer 20, seller or sellers 10, financial clearinghouse 40) and attempts to retrieve any goods already shipped to the buyer 10. If the buyer 10 ACCEPTS the NOS in step S37, then the broker sends the NOS to the financial clearinghouse 40 for processing against the buyer's credit line in step S39.

Figures 1, 4B:
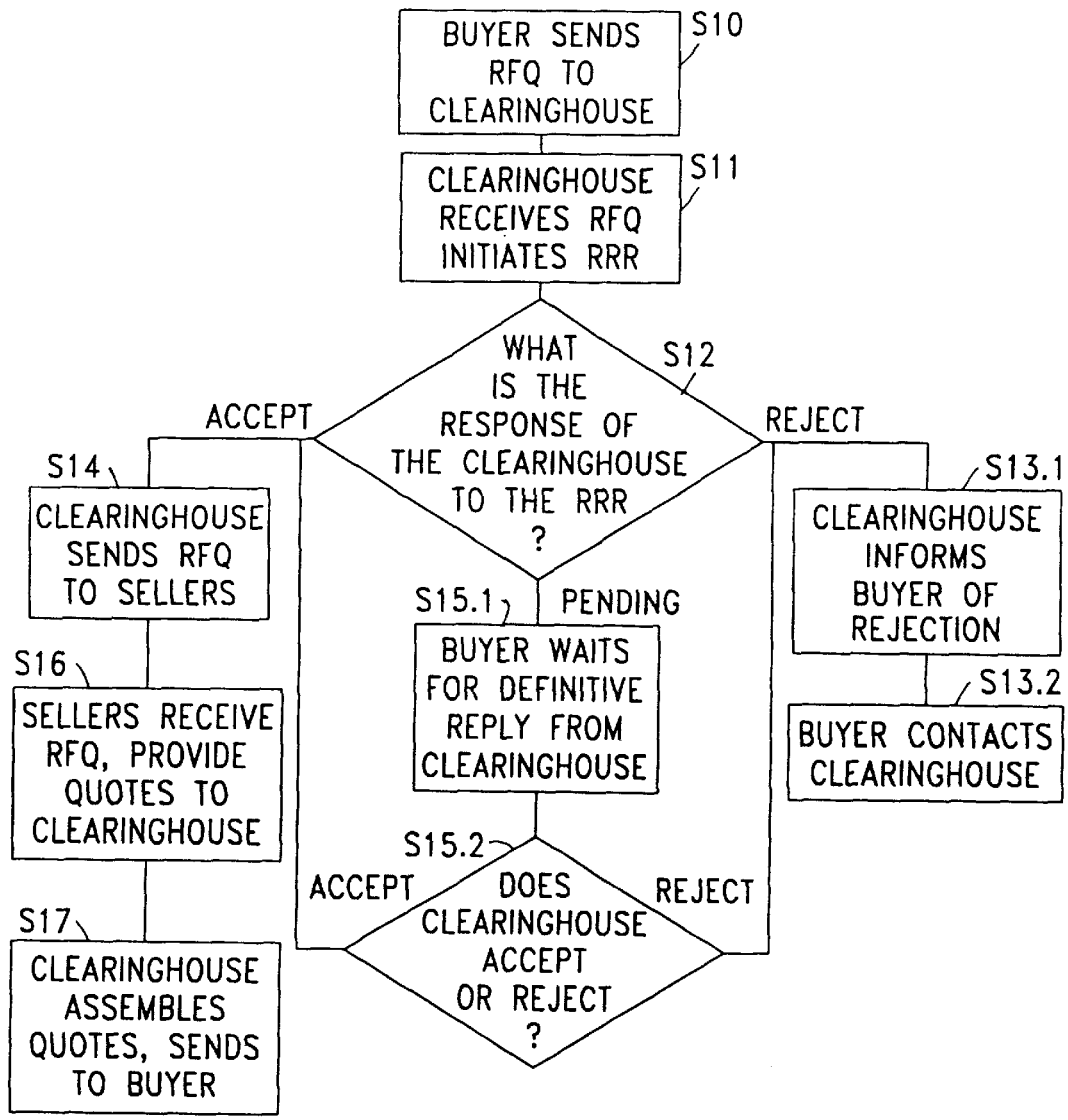
FIG. 4B is an illustrative flow chart showing a buy/sell transaction according to the first embodiment of the present invention.
Figures 2, 4B:
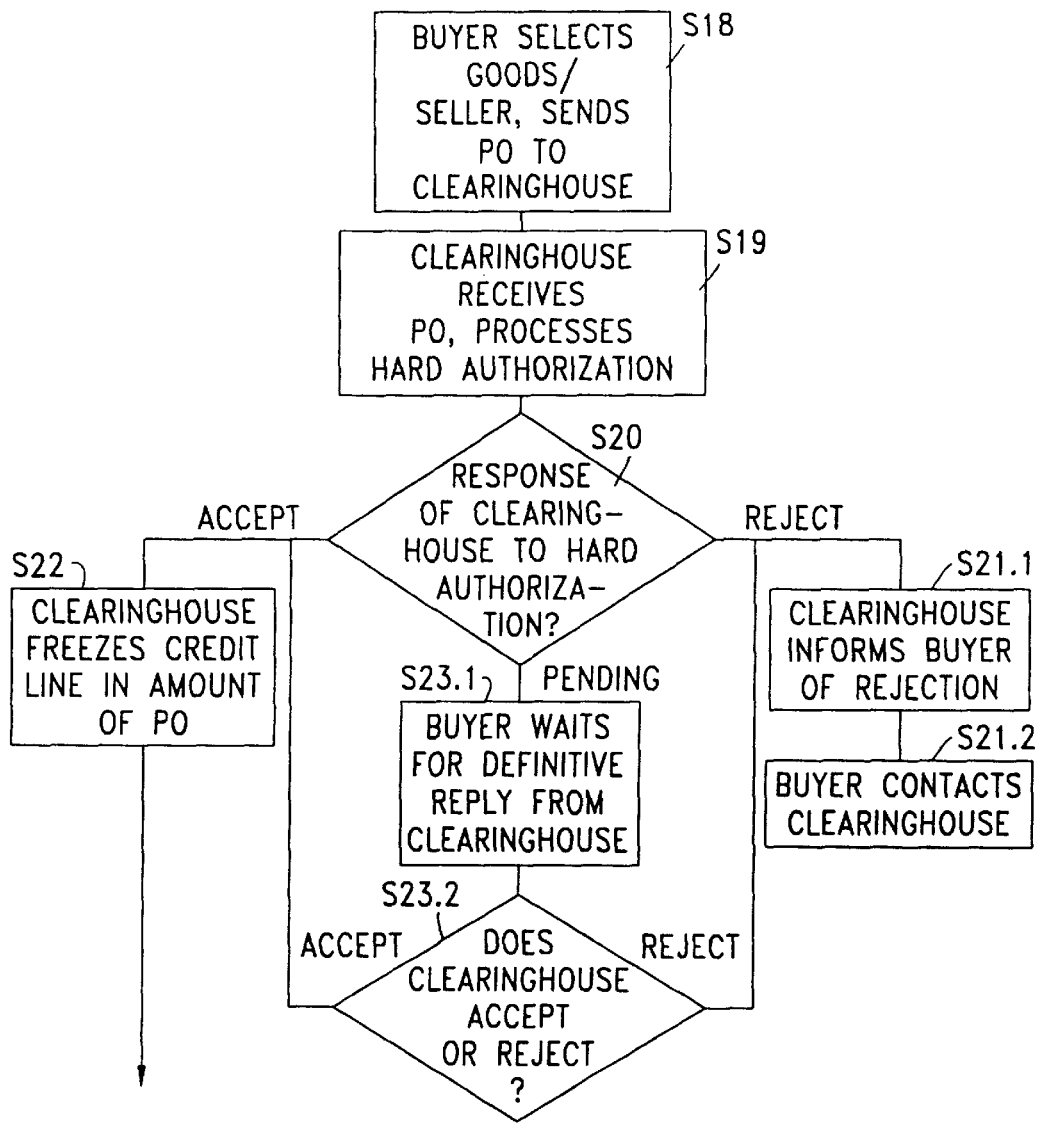
Figures 3, 4B:
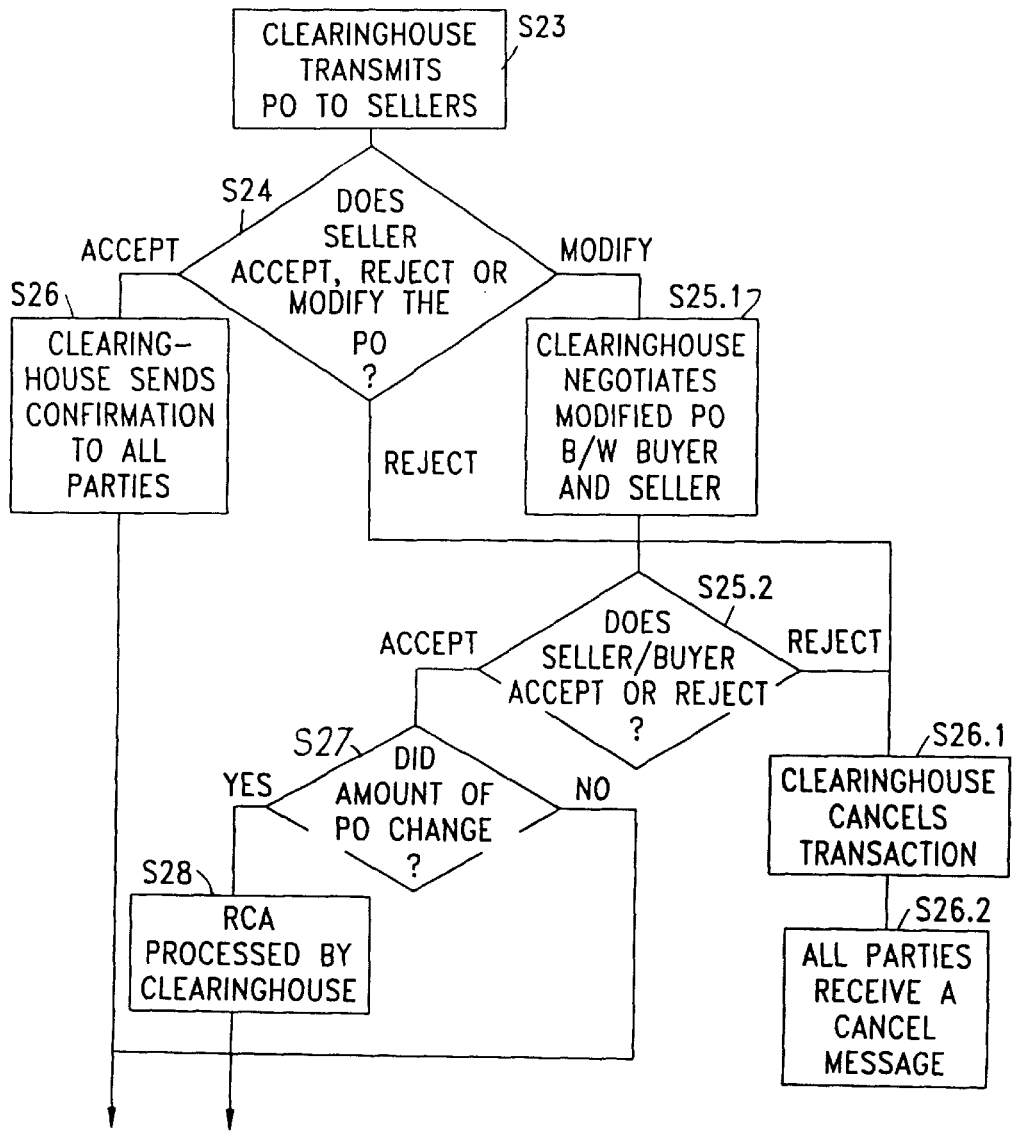
Figures 4, 4B:
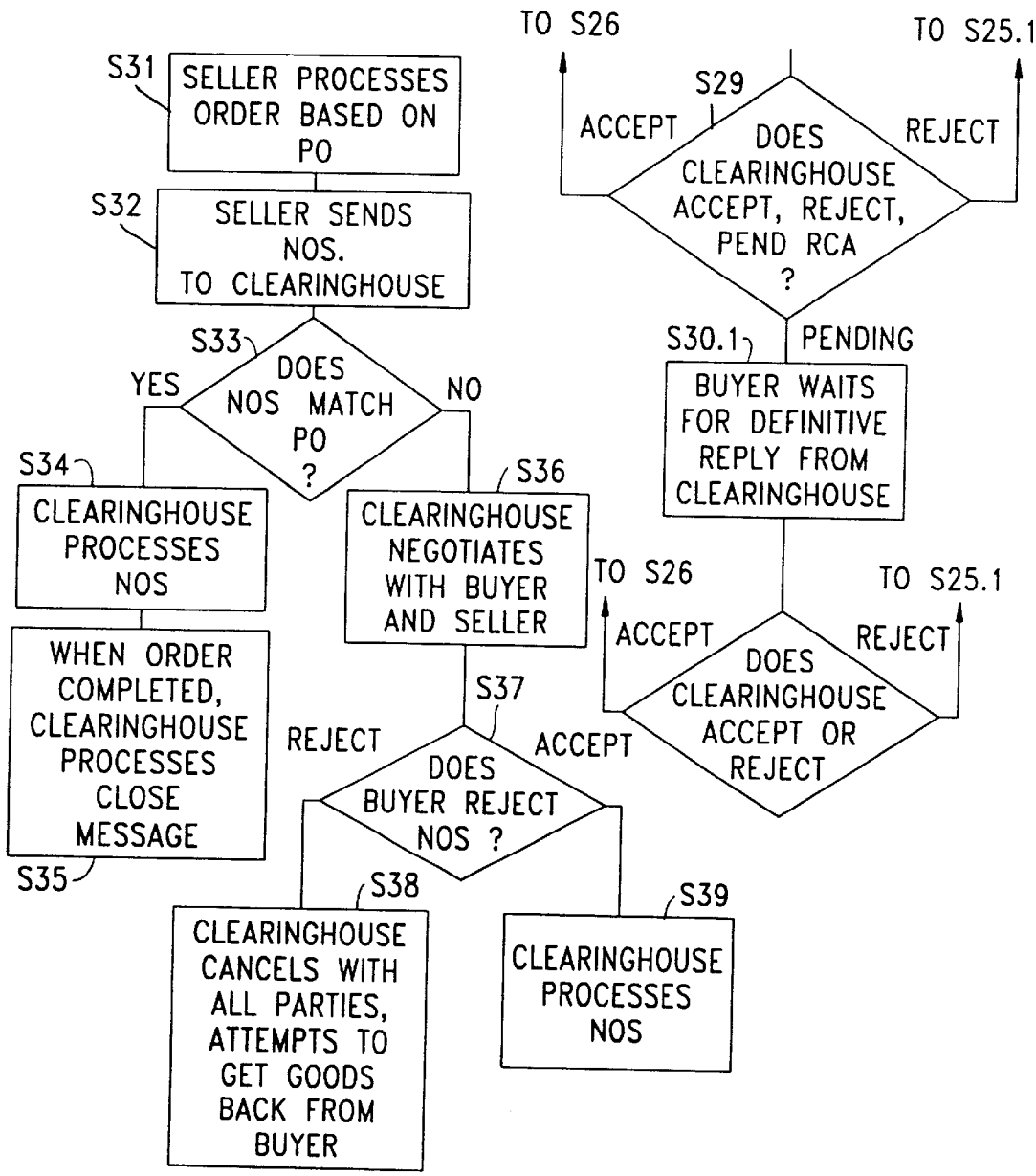

Although FIG. 4A has been described with respect to the second embodiment of the present invention, which includes a broker 30 that acts as an on-line quote and order processing service, the first embodiment of the present invention performs substantially the same processing of a buy/sell transaction with the financial clearinghouse 40 performing the functions described as being performed by the broker 30, as shown in FIG. 4B.

FIG. 5A illustrates an exemplary set of rules used by the financial clearinghouse 40 according to the present invention to respond to a hard authorization request from a broker 30 when a buyer 20 has placed a PO with the broker 20, and the PO amount is equal to or less than the Open Line. As shown in FIG. 5A, the hard authorization rules depend on the following factors: the Buyer's Risk Classification; the Available Open Line (i.e., the buyer's credit line minus any existing balance owed to the financial clearinghouse 40 minus any amount of the line that has been frozen in response to another authorized PO of the buyer 20); Open Invoices; the buyer's Payment History; and the Authorization Amount. In addition, the response to a hard authorization request can depend on the number of disputed transactions involving the buyer 30.

The Risk Classification factor refers to the buyer's risk classification, i.e. the rating of 1 to 5 that is generated by the financial clearinghouse 40 or is obtained directly from a commercial credit report on the buyer 20. The Available Open Line Factor refers to whether the buyer has credit line available for the current transaction. The Available Open Line can also include a dispute indicator which indicates when a buyer 20 disputes an invoice from the financial clearinghouse 40 (e.g., the buyer 20 refuses to pay an invoice because of some dissatisfaction with the goods delivered by the seller 10, and the invoice becomes past due). Thus, for example, if the buyer 20 disputes three or more invoices that have become past due, then the financial clearinghouse 40 resets the buyer's credit line to 0. Accordingly, the Available Open Line becomes 0 and the buyer 20 cannot complete a purchase through the financial clearinghouse 40. In addition, any invoice that is disputed is treated as frozen and thus subtracted from the buyer's credit line for determining the Available Open Line.

The Open Invoices factor refers to outstanding invoices due to the financial clearinghouse 40 by the buyer 20. If there are outstanding invoices, the open invoices factor also includes how many days the invoice is past due, e.g., less than 30 days, between 30 and 44 days or greater than 45 days. The Payment History factor refers to the buyer's payment history with the financial clearinghouse 40 for the past six months. The Payment History factor includes how many days the buyer's payments to the financial clearinghouse 40 were past due, e.g. greater than 15, 30 or 45 days past due.

As a function of the factors shown in FIG. 5A, a response of the financial clearinghouse 40 to a hard authorization request is either an APPROVAL, PEND or REJECT. Once the financial clearinghouse 40 provides an APPROVAL message, the APPROVAL message has a time limit within which the buyer 20 and seller 10 must agree upon the PO. While the system according to the present invention provides for negotiations of disputes over the PO, agreement between the parties must be reached before the hard authorization response expires, or otherwise a new request for a hard authorization must be made by the broker 20.

For example, if a buyer 20 is a risk classification 4, has available open line, has open invoices against the financial clearinghouse 40 that are 16–30 days past due, has no payments to the financial clearinghouse 40 in the past six months that were more than 30 days past due, and the amount of the PO is less than or equal to the available open line, then the response of the financial clearinghouse 40 to a hard authorization request from a broker 30 shown in FIG. 5A would be an APPROVAL. At this time, the financial clearinghouse 40 freezes a portion of the buyer's credit line equal to the amount of the PO.

If, however, a buyer 20 is a risk classification 1, 2 or 3, has available open line, has at least one open invoice against the financial clearinghouse 40 that is 30–44 days past due, has at least one payment to the financial clearinghouse 40 in the past six months that was greater than 45 days past due, and the PO amount is equal to or less than the buyer's available open line, then the response of the financial clearinghouse 40 to a hard authorization request from the broker 30 shown in FIG. 5A would be a PEND. In response to the PEND message, the financial clearinghouse 40 evaluates additional credit and payment information, such as payment trends of the buyer 20 obtained from a commercial credit report. Based on the evaluation of the additional information, the financial clearinghouse 40 then provides the broker 30 with an APPROVAL or a REJECT message. The evaluation of additional information by the financial clearinghouse 40 can be done on line or can be done off-line, allowing for human intervention by financial clearinghouse 40 personnel and a subsequent resumption of electronic processing of the transaction.

Also, as shown in FIG. 5A, regardless of the risk classification of the buyer 20, if the buyer 20 has no available open line, the financial clearinghouse 40 provides a PEND message in response to a hard authorization request from a broker 30. In response to the PEND message, the financial clearinghouse 40 reviews the amount of the current credit line of the buyer 20 for possible adjustment and then provides either an APPROVAL or REJECT message to the broker 30.

FIG. 5B illustrates an exemplary set of rules used by the financial clearinghouse 40 according to the present invention to respond to a hard authorization request from a broker 30 when a buyer 20 has placed a PO with the broker 30, and the PO amount is up to 10% greater than the credit line of the buyer 20. As shown in FIG. 5B, the hard authorization rules depend on the same factors shown in FIG. 5A and thus the factors will not be described further. The rules shown in FIG. 5B operate similarly to the rules shown in FIG. 5A. For example, if a buyer 20 is a risk classification 4, has available open line, has no open invoices against the financial clearinghouse 40, had more than one payment that was at least 1–15 days past due, and the PO amount is less than or equal to 10% over the buyer's open line, the financial clearinghouse 40 provides a REJECT message in response to a hard authorization request from the broker 30.

Although FIGS. 5A and 5B have been described with respect to the second embodiment of the present invention, which includes a broker 30 who acts as an on-line quote and order processing service, the first embodiment of the present invention performs substantially the same processing of a hard authorization request with the financial clearinghouse 40 performing the functions described as being performed by the broker 30.

What is claimed is:

1. A financial clearinghouse enabling a buyer to request and obtain quotes for at least one of goods and services from a plurality of sellers via a communications network, the financial clearinghouse comprising:
    means for receiving a registration application of the buyer;
    means for approving the registration application of the buyer;
    means for automatically determining a risk classification for the buyer in response to the approved registration application;
    means for automatically determining a risk-based discount fee for the buyer as a function of the risk classification, the discount fee establishing a percentage of a purchase price of the at least one of goods and services requested by the buyer;
    means for receiving a request for a quote from the buyer for the at least one of the goods and services; and
    means for receiving the quote from at least one of the plurality of sellers, the quote being determined as a function of the discount fee.

2. The financial clearinghouse as recited in claim 1, further comprising:
    means for forwarding the request for the quote for at least one of the goods and services to at least one of the plurality of sellers.

3. The financial clearinghouse as recited in claim 1, wherein the risk classification is determined as a function of information provided in the registration application.

4. The financial clearinghouse as recited in claim 1, wherein the risk classification determined as a function of credit information received from an on-line credit repository.

5. The financial clearinghouse as recited in claim 1, wherein the risk classification is determined in real time.

6. The financial clearinghouse as recited in claim 1, further comprising:
    means for transmitting an amount equal to the purchase price less the discount fee multiplied by the purchase price to one of the plurality of sellers selected by the buyer.

7. The financial clearinghouse as recited in claim 1, further comprising:
    means for transmitting an invoice for an amount equal to the purchase price to the buyer.

8. The financial clearinghouse as recited in claim 1, further comprising:
    means for determining a credit line for the buyer.

9. A computer-implemented method of enabling a buyer to request and obtain a quote for at least one of goods and services from a plurality of sellers, the method comprising the steps of:
    receiving a registration application of the buyer;
    determining whether to approve the registration application of the buyer;

automatically determining a risk classification for the buyer;

automatically determining a risk-based discount fee for the buyer as a function of the risk classification, the discount fee establishing a percentage of a purchase price of at least one of the goods and services requested by the buyer;

receiving a request for a quote from the buyer for at least one of the goods and services; and receiving the quote from at least one of the plurality of sellers, the quote being determined as a function of the discount fee.

10. The method as recited in claim 9, further comprising the step of:

forwarding the request for the quote for at least one of the goods and services to at least one of the plurality of sellers.

11. The method as recited in claim 9, wherein the risk classification is based on information provided in the registration application.

12. The method as recited in claim 9, wherein the risk classification is based on credit information received from an on-line credit repository.

13. The method as recited in claim 9, wherein the risk classification is determined in real time.

14. The method as recited in claim 9, further comprising the step of:

transmitting an amount equal to the purchase price less the discount fee multiplied by the purchase price to one of the plurality of sellers selected by the buyer.

15. The method as recited in claim 9, further comprising the step of:

transmitting an invoice for an amount equal to the purchase price to the buyer.

16. The method as recited in claim 9, further comprising the step of:

determining a credit line for the buyer.

17. A financial clearinghouse for communication over a communication network with at least one of a buyer, a seller and a broker for an electronic transaction for a sale of goods or services, the financial clearinghouse comprising:

a message processor for receiving a first message from the communication network;

an Electronic Data Interchange (EDI) translator for translating the first message having a first format provided by the message processor to a translated first message having a second format;

a main processor for processing the translated first message provided by the EDI translator;

an input device communicating with the main processor;

a output device communicating with the main processor;

a memory communication with the main processor, the memory including an accounting module, the main processor executing instructions of the accounting module to establish an accounts receivable database, wherein the accounts receivable database includes at least one of an amount paid by the buyer, an amount due to the seller and an amount due to the broker, the memory also including a database module for providing instructions to the main processor, providing rules for credit analysis, and establishing a credit database, wherein at least one of a risk rating, a discount fee and a credit limit for the buyer is determined using the credit database;

a reverse EDI translator for receiving a second message from the main processor, the reverse EDI translator translating the second message having the second format received from the main processor to a translated second message having the first format;

wherein the translated second message is provided to the communication network to at least one of the buyer, seller and broker to facilitate the electronic transaction.

18. The financial clearinghouse as recited in claim 17, wherein the first format is EDI and the second format is ASCII.

19. The financial clearinghouse as recited in claim 17, wherein the input device accesses information from at least one of a user and the communication network, and the output device displays data to the user.

20. A financial clearinghouse for conducting an electronic transaction for a sale of goods over a communication network, the financial clearinghouse comprising:

an EDI system for processing messages exchanged over the communication network between parties to the electronic transaction;

a processing system communicating with the EDI system;

an input device communicating with the processing system;

an output device communicating with the processing system; and a memory communicating with the processing system including a database module for providing instructions to the processing system, providing rules for credit analysis, and establishing a credit database, wherein at least one of a risk rating, a discount fee and a credit limit is determined for a buying party to the electronic transaction using the credit database and wherein in an electronic transaction between the buying party and at least one seller of a plurality of sellers the at least one of the risk rating, the discount fee and the credit limit is used to establish a payment amount to the seller.

21. The EDI system of claim 20 further comprising a translator for translating a message received over the communication network in a first format to a message having a second format.

22. The EDI system of claim 21 further comprising a reverse translator for translating a message received in the second format into a message having the first format prior to providing the message to a party to the electronic transaction over the communication network.

23. The financial clearinghouse as recited in claim 20 further comprising a message processor for receiving a message transmitted over the communication network by a party to the electronic transaction.

24. The financial clearinghouse as recited in claim 20, wherein the input device accesses information from at least one of a user and the communication network, and the output device displays data to the user.

25. The financial clearinghouse as recited in claim 20, wherein the EDI system translates messages between an EDI format and an ASCII format.

26. The financial clearinghouse as recited in claim 20, wherein the memory also includes an accounting module, the processing system executing instructions of the accounting module to establish an accounts receivable database, wherein the accounts receivable database includes at least one of an amount paid by and an amount due to a party to the electronic transaction.

* * * * *